US012742860B2

(12) United States Patent
Li et al.

(10) Patent No.: US 12,742,860 B2
(45) Date of Patent: Sep. 22, 2026

(54) FIBER-BASED TRANSMITTER AND RECEIVER CHANNELS OF LIGHT DETECTION AND RANGING SYSTEMS

(71) Applicant: Innovusion, Inc., Sunnyvale, CA (US)

(72) Inventors: Yufeng Li, Milpitas, CA (US); Peng Wan, San Jose, CA (US); Randy Xi Li, Sunnyvale, CA (US); Yimin Li, Cupertino, CA (US); Junwei Bao, Los Altos, CA (US); Rui Zhang, Palo Alto, CA (US)

(73) Assignee: SEYOND, INC., Sunnyvale, CA (US)

( * ) Notice: Subject to any disclaimer, the term of this patent is extended or adjusted under 35 U.S.C. 154(b) by 402 days.

(21) Appl. No.: 18/367,250

(22) Filed: Sep. 12, 2023

(65) Prior Publication Data

US 2023/0417879 A1 Dec. 28, 2023

Related U.S. Application Data

(63) Continuation of application No. 17/682,956, filed on Feb. 28, 2022, now Pat. No. 11,789,128.

(Continued)

(51) Int. Cl.
*G01S 7/481* (2006.01)
*G01S 7/4865* (2020.01)

(Continued)

(52) U.S. Cl.
CPC .......... *G01S 7/4818* (2013.01); *G01S 7/4814* (2013.01); *G01S 7/4816* (2013.01); *G01S 7/4817* (2013.01);

(Continued)

(58) Field of Classification Search
CPC .... G01S 7/4818; G01S 17/931; G01S 7/4814; G01S 7/4816; G01S 7/4817; G01S 7/4865; G02B 6/4206; G02B 6/425; G02B 6/4257
See application file for complete search history.

(56) References Cited

U.S. PATENT DOCUMENTS 3,897,150 A 7/1975 Bridges et al.
4,412,720 A 11/1983 Costa (Continued)

FOREIGN PATENT DOCUMENTS

CN 1677050 A 10/2005
CN 204758280 U 11/2015

(Continued)

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

(Continued)

*Primary Examiner* — Kenneth J Malkowski
(74) *Attorney, Agent, or Firm* — MASCHOFF BRENNAN; Ran Pang; Liang Huang

(57) ABSTRACT

A LiDAR system is provided. The LiDAR system comprises a plurality of transmitter channels and a plurality of receiver channels. The plurality of transmitter channels are configured to transmit a plurality of transmission light beams to a field-of-view at a plurality of different transmission angles, which are then scanned to cover the entire field-of-view. The LiDAR system further comprises a collection lens disposed to receive and redirect return light obtained based on the plurality of transmission light beams illuminating one or more objects within the field-of-view. The LiDAR system further comprises a plurality of receiver channels optically (Continued)

coupled to the collection lens. Each of the receiver channels is optically aligned based on a transmission angle of a corresponding transmission light beam. The LiDAR system further comprises a plurality of detector assemblies optically coupled to the plurality of receiver channels.

29 Claims, 17 Drawing Sheets

Related U.S. Application Data

(60) Provisional application No. 63/209,856, filed on Jun. 11, 2021, provisional application No. 63/155,297, filed on Mar. 1, 2021.

(51) Int. Cl.
*G01S 17/931* (2020.01)
*G02B 6/42* (2006.01)

(52) U.S. Cl.
CPC .......... *G01S 7/4865* (2013.01); *G01S 17/931* (2020.01); *G02B 6/4206* (2013.01); *G02B 6/425* (2013.01); *G02B 6/4257* (2013.01)

(56) References Cited

U.S. PATENT DOCUMENTS 4,464,048 A 8/1984 Farlow
4,862,267 A 8/1989 Ulich
5,006,721 A 4/1991 Cameron et al.
5,157,451 A 10/1992 Taboada et al.
5,303,084 A 4/1994 Pflibsen et al.
5,319,434 A 6/1994 Croteau et al.
5,369,661 A 11/1994 Yamaguchi et al.
5,442,358 A 8/1995 Keeler et al.
5,546,188 A 8/1996 Wangler et al.
5,579,153 A 11/1996 Laming et al.
5,657,077 A 8/1997 DeAngelis et al.
5,793,491 A 8/1998 Wangler et al.
5,838,239 A 11/1998 Stern et al.
5,864,391 A 1/1999 Hosokawa et al.
5,926,259 A 7/1999 Bamberger et al.
5,936,756 A 8/1999 Nakajima
5,953,110 A 9/1999 Burns
6,163,378 A 12/2000 Khoury
6,317,202 B1 11/2001 Hosokawa et al.
6,594,000 B2 7/2003 Green et al.
6,650,404 B1 11/2003 Crawford
6,950,733 B2 9/2005 Stopczynski
7,128,267 B2 10/2006 Reichenbach et al.
7,202,841 B2 4/2007 Munro
7,345,271 B2 3/2008 Boehlau et al.
7,440,084 B2 10/2008 Kane
7,440,175 B2 10/2008 Di Teodoro et al.
7,489,865 B2 2/2009 Varshneya et al.
7,576,837 B2 8/2009 Liu et al.
7,830,527 B2 11/2010 Chen
7,835,068 B1 11/2010 Brooks et al.
7,847,235 B2 12/2010 Krupkin et al.
7,880,865 B2 2/2011 Tanaka et al.
7,936,448 B2 5/2011 Albuquerque et al.
7,969,558 B2 6/2011 Hall
7,982,861 B2 7/2011 Abshire et al.
8,072,582 B2 12/2011 Meneely
8,120,863 B2 2/2012 Journot
8,471,895 B2 6/2013 Banks
8,599,381 B2 12/2013 Statz et al.
8,736,818 B2 5/2014 Weimer et al.
8,749,764 B2 6/2014 Hsu et al.
8,788,445 B2 7/2014 Hueter et al.
8,812,149 B2 8/2014 Doak
8,823,353 B2 9/2014 Zhang et al.
8,848,174 B2 9/2014 Scott et al.
8,984,928 B2 3/2015 Shiraishi
9,048,616 B1 6/2015 Robinson
9,065,243 B2 6/2015 Asobe et al.
9,086,273 B1 7/2015 Gruver et al.
9,087,059 B2 7/2015 Bissig et al.
9,194,701 B2 11/2015 Bosch
9,255,790 B2 2/2016 Zhu
9,300,321 B2 3/2016 Zalik et al.
9,304,316 B2 4/2016 Weiss et al.
9,316,724 B2 4/2016 Gehring et al.
9,354,485 B2 5/2016 Fermann et al.
9,510,505 B2 12/2016 Halloran et al.
9,575,184 B2 2/2017 Gilliland et al.
9,605,998 B2 3/2017 Nozawa
9,621,876 B2 4/2017 Federspiel
9,638,799 B2 5/2017 Goodwin et al.
9,696,426 B2 7/2017 Zuk et al.
9,702,986 B2 7/2017 Batcheller et al.
9,804,264 B2 10/2017 Villeneuve et al.
9,810,786 B1 11/2017 Welford et al.
9,812,838 B2 11/2017 Villeneuve et al.
RE46,672 E 1/2018 Hall
9,857,468 B1 1/2018 Eichenholz et al.
9,869,754 B1 1/2018 Campbell et al.
9,880,263 B2 1/2018 Droz et al.
9,880,278 B2 1/2018 van Uffelen et al.
9,885,778 B2 2/2018 Dussan
9,897,689 B2 2/2018 Dussan
9,915,726 B2 3/2018 Bailey et al.
9,927,915 B2 3/2018 Frame et al.
9,958,646 B2 5/2018 Eichenholz et al.
10,007,001 B1 6/2018 LaChapelle et al.
10,012,732 B2 7/2018 Eichenholz et al.
10,031,214 B2 7/2018 Rosenzweig et al.
10,042,159 B2 8/2018 Dussan et al.
10,061,019 B1 8/2018 Campbell et al.
10,073,166 B2 9/2018 Dussan
10,078,133 B2 9/2018 Dussan
10,094,925 B1 10/2018 LaChapelle
10,157,630 B2 12/2018 Vaughn et al.
10,191,155 B2 1/2019 Curatu
10,215,847 B2 2/2019 Scheim et al.
10,267,898 B2 4/2019 Campbell et al.
10,296,656 B2 5/2019 Li et al.
10,310,058 B1 6/2019 Campbell et al.
10,324,170 B1 6/2019 Engberg, Jr. et al.
10,324,185 B2 6/2019 McWhirter et al.
10,393,877 B2 8/2019 Hall et al.
10,429,495 B1 10/2019 Wang et al.
10,444,356 B2 10/2019 Wu et al.
10,451,716 B2 10/2019 Hughes et al.
10,466,342 B1 11/2019 Zhu et al.
10,502,831 B2 12/2019 Eichenholz
10,509,112 B1 12/2019 Pan
10,520,602 B2 12/2019 Villeneuve et al.
10,557,923 B2 2/2020 Watnik et al.
10,564,266 B2 2/2020 O'Keeffe
10,571,567 B2 2/2020 Campbell et al.
10,578,720 B2 3/2020 Hughes et al.
10,591,600 B2 3/2020 Villeneuve et al.
10,627,491 B2 4/2020 Hall et al.
10,641,872 B2 5/2020 Dussan et al.
10,663,585 B2 5/2020 McWhirter
10,663,596 B2 5/2020 Dussan et al.
10,663,664 B2 5/2020 LaChapelle
10,884,360 B2 1/2021 Kikuchi
10,908,262 B2 2/2021 Dussan
10,908,265 B2 2/2021 Dussan
10,908,268 B2 2/2021 Zhou et al.
10,969,475 B2 4/2021 Li et al.
10,983,218 B2 4/2021 Hall et al.
11,002,835 B2 5/2021 Pan et al.
11,009,605 B2 5/2021 Li et al.
11,022,679 B2 6/2021 Abari et al.
11,176,405 B2 11/2021 Pacala et al.
11,178,381 B2 11/2021 Pacala et al.
11,190,750 B2 11/2021 Pacala et al.
11,194,048 B1 12/2021 Burbank et al.
11,287,515 B2 3/2022 Pacala et al.
11,422,236 B2 8/2022 Pacala et al.

(56) References Cited

U.S. PATENT DOCUMENTS

2002/0138251 A1 9/2002 Green et al.
2004/0135992 A1 7/2004 Munro
2005/0033497 A1 2/2005 Stopczynski
2005/0190424 A1 9/2005 Reichenbach et al.
2005/0195383 A1 9/2005 Breed et al.
2006/0071846 A1 4/2006 Yanagisawa et al.
2007/0091848 A1 4/2007 Teodoro et al.
2007/0216995 A1 9/2007 Bollond et al.
2008/0132752 A1 6/2008 Choy
2008/0174762 A1 7/2008 Liu et al.
2008/0183136 A1 7/2008 Du et al.
2009/0010644 A1 1/2009 Varshneya et al.
2009/0051926 A1 2/2009 Chen
2009/0059201 A1 3/2009 Willner et al.
2009/0067453 A1 3/2009 Mizuuchi et al.
2009/0147239 A1 6/2009 Zhu et al.
2009/0262760 A1 10/2009 Krupkin et al.
2009/0316134 A1 12/2009 Michael et al.
2010/0006760 A1 1/2010 Lee et al.
2010/0020306 A1 1/2010 Hall
2010/0020377 A1 1/2010 Borchers et al.
2010/0027602 A1 2/2010 Abshire et al.
2010/0045965 A1 2/2010 Meneely
2010/0053715 A1 3/2010 O'Neill et al.
2010/0128109 A1 5/2010 Banks
2010/0271614 A1 10/2010 Albuquerque et al.
2011/0181864 A1 7/2011 Schmitt et al.
2012/0038903 A1 2/2012 Weimer et al.
2012/0124113 A1 5/2012 Zalik et al.
2012/0221142 A1 8/2012 Doak
2013/0107016 A1 5/2013 Federspiel
2013/0118971 A1 5/2013 Retkowski et al.
2013/0241761 A1 9/2013 Cooper et al.
2013/0293867 A1 11/2013 Hsu et al.
2013/0293946 A1 11/2013 Fermann et al.
2013/0329279 A1 12/2013 Nati et al.
2013/0342822 A1 12/2013 Shiraishi
2014/0078514 A1 3/2014 Zhu
2014/0104594 A1 4/2014 Gammenthaler
2014/0347850 A1 11/2014 Bösch
2014/0350836 A1 11/2014 Stettner et al.
2015/0078123 A1 3/2015 Batcheller et al.
2015/0084805 A1 3/2015 Dawber
2015/0109603 A1 4/2015 Kim et al.
2015/0118692 A1 4/2015 Zuk et al.
2015/0139259 A1 5/2015 Robinson
2015/0158489 A1 6/2015 Oh et al.
2015/0338270 A1 11/2015 Williams et al.
2015/0355327 A1 12/2015 Goodwin et al.
2016/0047896 A1 2/2016 Dussan
2016/0061655 A1 3/2016 Nozawa
2016/0061935 A1 3/2016 McCloskey et al.
2016/0100521 A1 4/2016 Halloran et al.
2016/0117048 A1 4/2016 Frame et al.
2016/0172819 A1 6/2016 Ogaki
2016/0178736 A1 6/2016 Chung
2016/0226210 A1 8/2016 Zayhowski et al.
2017/0003116 A1 1/2017 Yee et al.
2017/0153319 A1 6/2017 Villeneuve et al.
2017/0192242 A1 7/2017 Laycock
2017/0242104 A1 8/2017 Dussan
2017/0299721 A1 10/2017 Eichenholz et al.
2017/0307738 A1 10/2017 Schwarz et al.
2017/0365105 A1 12/2017 Rao et al.
2018/0003946 A1 1/2018 De Greef et al.
2018/0040171 A1 2/2018 Kundu et al.
2018/0047900 A1 2/2018 Reid
2018/0050704 A1 2/2018 Tascione et al.
2018/0069367 A1 3/2018 Villeneuve et al.
2018/0152691 A1 5/2018 Pacala et al.
2018/0156896 A1 6/2018 O'Keeffe
2018/0158471 A1 6/2018 Vaughn et al.
2018/0164439 A1 6/2018 Droz et al.
2018/0188356 A1 7/2018 Bao et al.
2018/0188357 A1 7/2018 Li et al.
2018/0188358 A1 7/2018 Li et al.
2018/0188371 A1 7/2018 Bao et al.
2018/0210084 A1 7/2018 Zwölfer et al.
2018/0245902 A1 8/2018 Oliver
2018/0275274 A1 9/2018 Bao et al.
2018/0284241 A1 10/2018 Campbell et al.
2018/0284242 A1 10/2018 Campbell
2018/0284286 A1 10/2018 Eichenholz et al.
2018/0291134 A1 10/2018 Gao et al.
2018/0313445 A1 11/2018 Dyck et al.
2018/0327846 A1 11/2018 Lo et al.
2018/0329060 A1 11/2018 Pacala et al.
2018/0359480 A1 12/2018 Pacala et al.
2018/0364334 A1 12/2018 Xiang et al.
2019/0025428 A1 1/2019 Li et al.
2019/0107607 A1 4/2019 Danziger
2019/0107622 A1 4/2019 Andersson
2019/0107623 A1 4/2019 Campbell et al.
2019/0120942 A1 4/2019 Zhang et al.
2019/0120962 A1 4/2019 Gimpel et al.
2019/0154804 A1 5/2019 Eichenholz
2019/0154807 A1 5/2019 Steinkogler et al.
2019/0212416 A1 7/2019 Li et al.
2019/0250254 A1 8/2019 Campbell et al.
2019/0257924 A1 8/2019 Li et al.
2019/0257927 A1* 8/2019 Yao ....................... G01S 7/4815
2019/0265334 A1 8/2019 Zhang et al.
2019/0265336 A1 8/2019 Zhang et al.
2019/0265337 A1 8/2019 Zhang et al.
2019/0265339 A1 8/2019 Zhang et al.
2019/0277952 A1 9/2019 Beuschel et al.
2019/0310368 A1 10/2019 LaChapelle
2019/0369215 A1 12/2019 Wang et al.
2019/0369258 A1 12/2019 Hall et al.
2019/0383915 A1 12/2019 Li et al.
2020/0064633 A1 2/2020 Maimone
2020/0142070 A1 5/2020 Hall et al.
2020/0166647 A1* 5/2020 Crouch .................. G01S 17/42
2020/0200880 A1 6/2020 Stoppel
2020/0249324 A1* 8/2020 Steinberg .................. B60S 1/02
2020/0256964 A1 8/2020 Campbell et al.
2020/0284906 A1 9/2020 Eichenholz et al.
2020/0292818 A1 9/2020 Amitai et al.
2020/0319310 A1 10/2020 Hall et al.
2020/0400798 A1 12/2020 Rezk et al.
2021/0088630 A9 3/2021 Zhang
2021/0103034 A1 4/2021 Kirillov
2021/0132196 A1 5/2021 Tsai et al.

FOREIGN PATENT DOCUMENTS

CN 204885804 U 12/2015
CN 108132472 A 6/2018
CN 207457508 U 6/2018
CN 207557465 U 6/2018
CN 109000795 A 12/2018
CN 208314210 U 1/2019
CN 208421228 U 1/2019
CN 208705506 U 4/2019
CN 108597471 B 5/2019
CN 209280923 U 8/2019
CN 108445488 B 11/2019
CN 110031823 B 3/2020
CN 108089201 B 4/2020
CN 108594206 B 4/2020
CN 109116331 B 4/2020
CN 109917408 B 4/2020
CN 11190256 A 5/2020
CN 109116366 B 5/2020
CN 109116367 B 5/2020
CN 110031822 B 5/2020
CN 111741727 A 10/2020
CN 211655309 U 10/2020
CN 109188397 B 11/2020
CN 109814086 B 11/2020
CN 109917348 B 11/2020
CN 110482856 B 11/2020
CN 110736975 B 11/2020
CN 109725320 B 12/2020

(56) References Cited

FOREIGN PATENT DOCUMENTS

| | | | |
|---|---|---|---|
| CN | 110780284 | B | 12/2020 |
| CN | 110780283 | B | 1/2021 |
| CN | 110784220 | B | 2/2021 |
| CN | 212823082 | U | 2/2021 |
| CN | 110492349 | B | 3/2021 |
| CN | 112601999 | A | 4/2021 |
| CN | 109950784 | B | 5/2021 |
| CN | 213182011 | U | 5/2021 |
| CN | 213750313 | U | 7/2021 |
| CN | 214151038 | U | 9/2021 |
| CN | 109814082 | B | 10/2021 |
| CN | 113491043 | A | 10/2021 |
| CN | 214795200 | U | 11/2021 |
| CN | 214795206 | U | 11/2021 |
| CN | 214895784 | | 11/2021 |
| CN | 214895810 | U | 11/2021 |
| CN | 215641806 | U | 1/2022 |
| CN | 112639527 | B | 2/2022 |
| CN | 215932142 | U | 3/2022 |
| CN | 112578396 | B | 4/2022 |
| CN | 115267727 | A | 11/2022 |
| CN | 223296134 | U | 9/2025 |
| EP | 0 757 257 | A2 | 2/1997 |
| EP | 1 237 305 | A2 | 9/2002 |
| EP | 1 923 721 | A1 | 5/2008 |
| EP | 2 167 445 | A2 | 2/2010 |
| EP | 2 395 368 | A1 | 12/2011 |
| EP | 2 889 642 | A1 | 7/2015 |
| GB | 1185322 | A | 3/1970 |
| GB | 1 427 164 | A | 3/1976 |
| GB | 2 000 411 | A | 1/1979 |
| GB | 9617529 | | 10/1996 |
| JP | 2007144667 | A | 6/2007 |
| JP | 2010035385 | A | 2/2010 |
| JP | 2017003347 | | 1/2017 |
| JP | 2017138301 | A | 8/2017 |
| KR | 10-2012-0013515 | A | 2/2012 |
| KR | 10-2013-0068224 | A | 6/2013 |
| KR | 10-2018-0107673 | A | 10/2018 |
| WO | 2017/110417 | A1 | 6/2017 |
| WO | 2018/125725 | A1 | 7/2018 |
| WO | 2018/128408 | A1 | 7/2018 |
| WO | 2018/128409 | A1 | 7/2018 |
| WO | 2018/128410 | A1 | 7/2018 |
| WO | 2018/175990 | A1 | 9/2018 |
| WO | 2018/182812 | A2 | 10/2018 |
| WO | 2019/079642 | A1 | 4/2019 |
| WO | 2018/165294 | A1 | 8/2019 |
| WO | 2019/165289 | A1 | 8/2019 |
| WO | 2019/185095 | A1 | 8/2019 |
| WO | 2020/013890 | A2 | 1/2020 |
| WO | 2020033161 | A1 | 2/2020 |

OTHER PUBLICATIONS

European Search Report, dated Jul. 17, 2020, for EP Application No. 18776977.3, 12 pages.
European Search Report, dated Jun. 17, 2021, for EP Application No. 18868896.4, 7 pages.
Extended European Search Report, dated Jul. 10, 2020, for EP Application No. 1 7367 38.8, 9 pages.
Extended European Search Report, dated Jul. 22, 2020, for EP Application No. 18736685.1, 10 pages.
Fiber laser, Wikipedia, https://en.wikipedia.org/wiki/Fiber_laser, 6 pages.
Gluckman, J. (May 13, 2016). "Design of the processing chain for a high-altitude, airborne, single-photon lidar mapping instrument," Proceedings of SPIE; [Proceedings of SPIE ISSN 0277-788X vol. 10524], SPIE, US, vol. 9832, 9 pages.
Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
Gunzung, Kim, et al. (Mar. 2, 2018). "A hybrid 3D Lidar imager based on pixel-by-pixel scanning and DS-OCDMA," p. Proceedings of SPIE [Proceedings of SPIE ISSN 0277-786X vol. 10524], SPIE, US, vol. 9751, pp. 975119-975119-8.
International Preliminary Report on Patentability, dated Apr. 30, 2020, for International Application No. PCT/US2018/056577, 8 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019278, 14 pages.
International Search Report and Written Opinion, dated Jan. 3, 2019, for International Application No. PCT/US2018/056577, 15 pages.
International Search Report and Written Opinion, dated Jul. 9, 2019, for International Application No. PCT/US2019/018987, 17 pages.
International Search Report and Written Opinion, dated Jun. 7, 2018, for International Application No. PCT/US2018/024185, 9 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
International Search Report and Written Opinion, dated Mar. 23, 2018, for International App ication No. PCT/US2018/012704, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Sep. 18, 2018, for international Application No. PCT/US2018/012116, 12 pages.
Mirrors, Physics LibreTexts, https://phys.libretexts.org/Bookshelves/Optics/Supplemental_Modules_(Components)/ Mirrors, (2021), 2 pages.
Office Action Issued in Japanese Patent Application No. 2019-538019 dated Nov. 30, 2021, 6 pages.
"Why Wavelengths Matter in Fiber Optics", FirstLight, https://www.firstlight.net/why-wavelengths-matter-in-fiber-optics/, (2021), 5 pages.
International Search Report and Written Opinion, dated May 25, 2022, for International Application No. PCT/US2022/018222, 15 pages.
Collimate definition, Dictionary.com, 2022, downloaded Sep. 2, 2022 from https:/www.dictionary.com/browse/collimate, 4 pages.
Office Action and Search Report received for Chinese Application No. 202280015452.X, mailed on Aug. 14, 2026, 22 pages (11 pages of original office action and 11 pages of English Translation).

* cited by examiner 1006
1024
1022
1002
710
1004
1012
1014

1122
1132
710
1114
1112
1128
1126

Fiber Length

A-B = 195 ±15mm
A-C = 215 ±15mm
A-D = 235 ±15mm
A-E = 255 ±15mm
A-F (2X) = 290 ±30mm

| CH # (from Top to Bottom) | Nominal Length (mm) | Tolerance (mm) |
|---|---|---|
| 1 | 195 | ±15 |
| 2 | 290 | ±30 |
| 3 | 215 | ±15 |
| 4 | 235 | ±15 |
| 5 | 290 | ±30 |
| 6 | 255 | ±15 |

FIBER-BASED TRANSMITTER AND RECEIVER CHANNELS OF LIGHT DETECTION AND RANGING SYSTEMS

CROSS-REFERENCE TO RELATED APPLICATIONS

This application is a continuation application of U.S. patent application Ser. No. 17/682,956, entitled "FIBER-BASED TRANSMITTER AND RECEIVER CHANNELS OF LIGHT DETECTION AND RANGING SYSTEMS," filed Feb. 28, 2022, which claims priority to U.S. Provisional Patent Application Ser. No. 63/155,297, filed Mar. 1, 2021, entitled "LIDAR RECEIVER FIBER ARRAY", and U.S. Provisional Patent Application Ser. No. 63/209,856, filed Jun. 11, 2021, entitled "LIDAR TRANSMITTER FIBER ARRAY". The contents of the applications are hereby incorporated by reference in their entireties for all purposes.

FIELD OF THE TECHNOLOGY

This disclosure relates generally to optical scanning and, more particularly, to a light detection and ranging (LiDAR) system having fiber-based transmitter channels and fiber-based receiver channels.

BACKGROUND

Light detection and ranging (LiDAR) systems use light pulses to create an image or point cloud of the external environment. Some typical LiDAR systems include a light source, a light transmitter, a light steering system, and a light receiver and detector. The light source generates a light beam that is directed by the light steering system in particular directions when being transmitted from the LiDAR system. When a transmitted light beam is scattered by an object, a portion of the scattered light returns to the LiDAR system as a return light pulse. The light receiver receives the return light pulse and the detector detects the return light pulse. Using the difference between the time that the return light pulse is detected and the time that a corresponding light pulse in the light beam is transmitted, the LiDAR system can determine the distance to the object using the speed of light. The light steering system can direct light beams along different paths to allow the LiDAR system to scan the surrounding environment and produce images or point clouds. LiDAR systems can also use techniques other than time-of-flight and scanning to measure the surrounding environment.

SUMMARY

Embodiments provided in this disclosure use a collimation lens and multiple transmitter channels having multiple transmitter optical fibers. Adjacent transmitter optical fibers are disposed at a preconfigured pitch. By configuring the pitch between the transmitter optical fibers in the array and/or the focal length of the collimation lens, a desired angular channel spacing of the transmitter channels can be obtained. Using multiple transmitter channels with a properly configured angular channel spacing, the scanning performance of the LiDAR system can be improved. Further, the dimension and complexity of the transmitter can be reduced such that the LiDAR system is more compact.

In one embodiment, a LiDAR system comprising a plurality of transmitter channels is provided. The plurality of transmitter channels comprising transmitter optical fibers disposed in an optical fiber housing at a pre-determined pitch from one another. A collimation lens is positioned to be optically coupled to the plurality of transmitter channels to receive a plurality of transmission light beams transmitted from the transmitter optical fibers. The collimation lens is configured to collimate the plurality of transmission light beams. A combination of the plurality of transmitter channels and the collimation lens is configured to transmit a plurality of collimated transmission light beams at an angular separation from each other to provide an angular channel spacing that is related to the pre-determined pitch.

Embodiments provided in this disclosure also use multiple receiver channels having multiple receiver optical fibers. The multiple receiver optical fibers can share a collection lens, thereby reducing the dimensions of the transceiver of a LiDAR system. Furthermore, because optical fibers are physically flexible, detector assemblies for detecting return light can be flexibly distributed such that they are positioned sufficiently apart from one another. As a result, both the optical crosstalk and electrical crosstalk between adjacent detector assemblies can be reduced or minimized. This in turn improves the detection accuracy and the overall performance of the LiDAR system.

In one embodiment, a LiDAR system comprising a plurality of transmitter channels and a plurality of receiver channels is provided. The plurality of transmitter channels are configured to transmit a plurality of transmission light beams to a field-of-view at a plurality of different transmission angles. The LiDAR system further comprises a collection lens disposed to receive and redirect return light obtained based on the plurality of transmission light beams illuminating one or more objects within the field-of-view. The LiDAR system further comprises a plurality of receiver channels optically coupled to the collection lens. Each of the receiver channels is optically aligned based on a transmission angle of a corresponding transmission light beam. The LiDAR system further comprises a plurality of detector assemblies optically coupled to the plurality of receiver channels. Each of the receiver channels directs redirected return light to a detector assembly of the plurality of detector assemblies.

BRIEF DESCRIPTION OF THE DRAWINGS

The present application can be best understood by reference to the figures described below taken in conjunction with the accompanying drawing figures, in which like parts may be referred to by like numerals.

DETAILED DESCRIPTION

Figure 1:
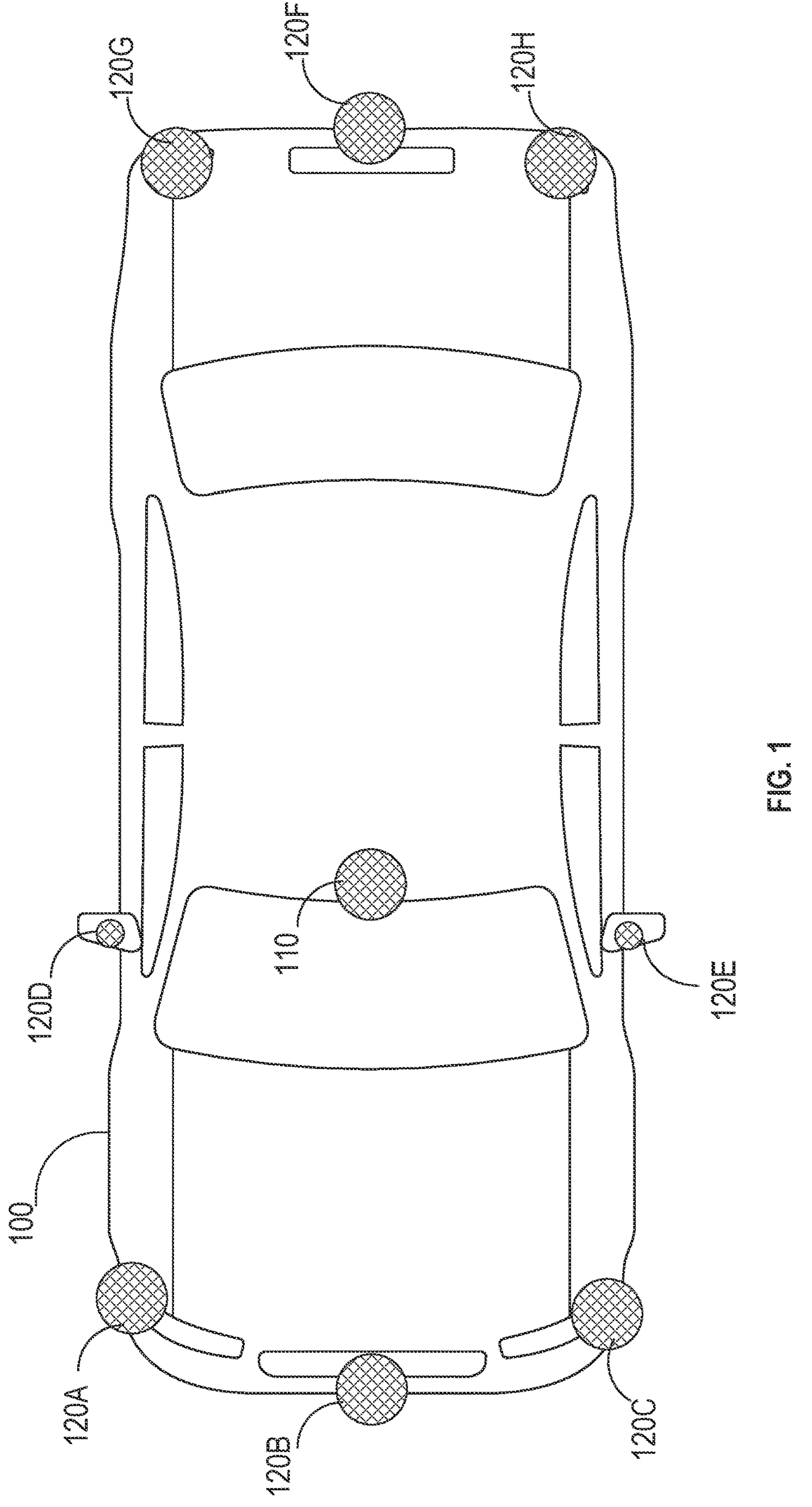
FIG. 1 illustrates one or more example LiDAR systems disposed or included in a motor vehicle.

To provide a more thorough understanding of the present invention, the following description sets forth numerous specific details, such as specific configurations, parameters, examples, and the like. It should be recognized, however, that such description is not intended as a limitation on the scope of the present invention but is intended to provide a better description of the exemplary embodiments.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the disclosure may be readily combined, without departing from the scope or spirit of the invention.

As used herein, the term "or" is an inclusive "or" operator and is equivalent to the term "and/or," unless the context clearly dictates otherwise.

The term "based on" is not exclusive and allows for being based on additional factors not described unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

Although the following description uses terms "first," "second," etc. to describe various elements, these elements should not be limited by the terms. These terms are only used to distinguish one element from another. For example, a first sensor could be termed a second sensor and, similarly, a second sensor could be termed a first sensor, without departing from the scope of the various described examples. The first sensor and the second sensor can both be sensors and, in some cases, can be separate and different sensors.

In addition, throughout the specification, the meaning of "a", "an", and "the" includes plural references, and the meaning of "in" includes "in" and "on".

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

Throughout the following disclosure, numerous references may be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, PLD, DSP, x86, ARM, RISC-V, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable medium storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices or network platforms, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

A LiDAR system may have one or more transmitter channels for transmitting laser beams. In some embodiments, using multiple transmitter channels, the LiDAR system transmits multiple light beams to scan the external environment. The LiDAR system's scanning resolution and speed can be improved by using multiple light beams compared to using just a single light beam. Furthermore, multiple transmitter channels facilitate reducing the requirement for moving a scanning optical device, such as a polygon mirror. For example, by using multiple transmitter channels, the rotational speed of the polygon mirror can be reduced while still allowing the LiDAR system to scan the same or similar areas of a field-of-view. On the other hand, multiple transmitter channels (e.g., four or more channels) may make it difficult to keep the LiDAR system compact. For example, if each transmitter channel has its own collimation lens and other optical and/or electrical components, the dimension of the transmitter may increase significantly. The complexity of the transmitter may increase too, making it less robust and reliable. Oftentimes, a compact LiDAR system may be needed to fit into small spaces in a vehicle (e.g., corner spaces, rearview mirrors, or the like). A reliable transmitter in a LiDAR system is also desired because the LiDAR system frequently must operate under large variations of environment conditions including temperature, humidity, vibration, etc. Therefore, there is a need for a compact and reliable LiDAR system with multiple transmitter channels.

Embodiments disclosed herein use multiple transmitter channels comprising an array of transmitter optical fibers. At least the end portions of the transmitter optical fibers are positioned to have a precision pitch between adjacent transmitter fibers. One or more collimation lenses are used to generate collimated transmission light beams for all transmitter channels. By configuring the pitch between the transmitter optical fibers and/or the focal length of the collimation lens, a desired angular channel spacing can be obtained. The angular channel spacing is a parameter that measures or represents the degree of angular separation between the light beams transmitted by the multiple transmitter channels to scan an FOV. When the adjacent transmitter channels are configured to have the proper angular channel spacing the multiple transmission light beams are positioned sufficiently apart at a desired angular separation to scan different areas within an FOV, providing a good coverage of the scanned areas and improving the scan resolution and speed. Therefore, the scanning performance of the LiDAR system can be improved by using multiple transmitter channels configured to have a proper angular channel spacing.

Furthermore, one or more embodiments in this disclosure also use a single collimation lens to form collimated transmission light beams for all transmitter channels. As a result, many transmitter channels can be assembled into a space corresponding to a single collimation lens, thereby reducing the dimensions of the transceiver and making the LiDAR system more compact. Moreover, by sharing a single collimation lens among the multiple transmitter channels, the complexity of the alignment of the transmitter assembly is reduced. It is understood, however, that multiple collimation lenses may be used in other embodiments.

A LiDAR system may also have one or more receiver channels corresponding to the one or more transmitter channels. For example, a particular transmitter channel transmits a light beam to an FOV. The light beam reaches an object. A portion of the light beam is scattered and/or reflected, thereby forming return light. A receiver channel corresponding to the particular transmitter channel receives the return light. Often, the quantity of the receiver channels is the same as that of the transmitter channels. Thus, for example, if a LiDAR system has four transmitter channels, there are correspondingly four receiver channels. If the multiple receiver channels share some optical components (e.g., a collection lens), certain components of the different receiver channels (e.g., photodetectors for different receiver channels) need to be placed close to one another. Moreover, in conventional technologies, because certain optical components are shared by multiple receiver channels, photodetector circuitry may need to be fixed at certain locations. This configuration causes undesired optical scattering and/or electrical crosstalk. Furthermore, photodetectors of the receiver channels may have placement errors, thereby further worsening the receiver performance. On the other hand, if each receiver channel has its own receiver optical components (e.g., the collection lens), the dimension of the receiver may increase significantly, making it difficult to fit into small spaces in a vehicle. The complexity of the receiver may increase too, making it less robust and reliable. As described above, a compact LiDAR system may be needed to fit into small spaces in a vehicle. And a reliable receiver in a LiDAR system is also desired because the LiDAR system frequently has to operate under large variations of environment conditions including temperature, humidity, vibration, etc. Therefore, there is a need for a compact and reliable LiDAR system with multiple receiver channels.

Embodiments disclosed herein use multiple receiver channels comprising multiple receiver optical fibers. The multiple receiver optical fibers use one or more collection lenses. In one embodiment, the receiver optical fiber can share a single collection lens, thereby reducing the dimensions of the transceiver of a LiDAR system. In turn, this makes the LiDAR system more compact. Furthermore, because optical fibers are physically flexible, detector assemblies for detecting return light can be flexibly distributed. Detector assemblies can be placed at any desired locations while still being coupled to their respective receiver optical fibers to receive return light. For example, adjacent detector assemblies can be placed at different locations sufficiently further away from each other. As a result, both the optical crosstalk and electrical crosstalk between adjacent detector assemblies can be reduced. An optical fiber typically has a limited acceptance angle defined by its core and cladding materials, thereby providing spatial filtering to reduce the amount of stray light and optical crosstalk. Moreover, adjacent receiver optical fibers can be positioned at a precise pitch from each other. The precision positioning of the receiver optical fibers further reduces alignment error such that return light generated from different transmission light beams are accurately aligned with the corresponding receiver optical fiber. The return light can thus be received properly at the corresponding receiver optical fiber with reduced or minimum loss or crosstalk. Embodiments of present invention are described below in details.

FIG. 1 illustrates one or more exemplary LiDAR systems 110 disposed or included in a motor vehicle 100. Motor vehicle 100 can be a vehicle having any automated level. For example, motor vehicle 100 can be a partially automated vehicle, a highly automated vehicle, a fully automated vehicle, or a driverless vehicle. A partially automated vehicle can perform some driving functions without a human driver's intervention. For example, a partially automated vehicle can perform blind-spot monitoring, lane keeping and/or lane changing operations, automated emergency braking, smart cruising and/or traffic following, or the like. Certain operations of a partially automated vehicle may be limited to specific applications or driving scenarios (e.g., limited to only freeway driving). A highly automated vehicle can generally perform all operations of a partially automated vehicle but with less limitations. A highly automated vehicle can also detect its own limits in operating the vehicle and ask the driver to take over the control of the vehicle when necessary. A fully automated vehicle can perform all vehicle operations without a driver's intervention but can also detect its own limits and ask the driver to take over when necessary. A driverless vehicle can operate on its own without any driver intervention.

In typical configurations, motor vehicle 100 comprises one or more LiDAR systems 110 and 120A-F. Each of LiDAR systems 110 and 120A-F can be a scanning-based LiDAR system and/or a non-scanning LiDAR system (e.g., a flash LiDAR). A scanning-based LiDAR system scans one or more light beams in one or more directions (e.g., horizontal and vertical directions) to detect objects in a field-of-view (FOV). A non-scanning based LiDAR system transmits laser light to illuminate an FOV without scanning. For example, a flash LiDAR is a type of non-scanning based LiDAR system. A flash LiDAR can transmit laser light to simultaneously illuminate an FOV using a single light pulse or light shot.

A LiDAR system is often an essential sensor of a vehicle that is at least partially automated. In one embodiment, as shown in FIG. 1, motor vehicle 100 may include a single LiDAR system 110 (e.g., without LiDAR systems 120A-F) disposed at the highest position of the vehicle (e.g., at the vehicle roof). Disposing LiDAR system 110 at the vehicle roof facilitates a 360-degree scanning around vehicle 100. In some other embodiments, motor vehicle 100 can include multiple LiDAR systems, including two or more of systems 110 and/or 120A-F. As shown in FIG. 1, in one embodiment, multiple LiDAR systems 110 and/or 120A-F are attached to vehicle 100 at different locations of the vehicle. For example, LiDAR system 120A is attached to vehicle 100 at the front right corner; LiDAR system 120B is attached to vehicle 100 at the front center; LiDAR system 120C is attached to vehicle 100 at the front left corner; LiDAR system 120D is attached to vehicle 100 at the right-side rear view mirror; LiDAR system 120E is attached to vehicle 100 at the left-side rear view mirror; and/or LiDAR system 120F is attached to vehicle 100 at the back center. In some embodiments, LiDAR systems 110 and 120A-F are independent LiDAR systems having their own respective laser sources, control electronics, transmitters, receivers, and/or steering mechanisms. In other embodiments, some of LiDAR systems 110 and 120A-F can share one or more components, thereby forming a distributed sensor system. In one example, optical fibers are used to deliver laser light from a centralized laser source to all LiDAR systems. It is understood that one or more LiDAR systems can be distributed and attached to a vehicle in any desired manner and FIG. 1 only illustrates one embodiment. As another example, LiDAR systems 120D and 120E may be attached to the B-pillars of vehicle 100 instead of the rear-view mirrors. As another example, LiDAR system 120B may be attached to the windshield of vehicle 100 instead of the front bumper.

Figure 2:
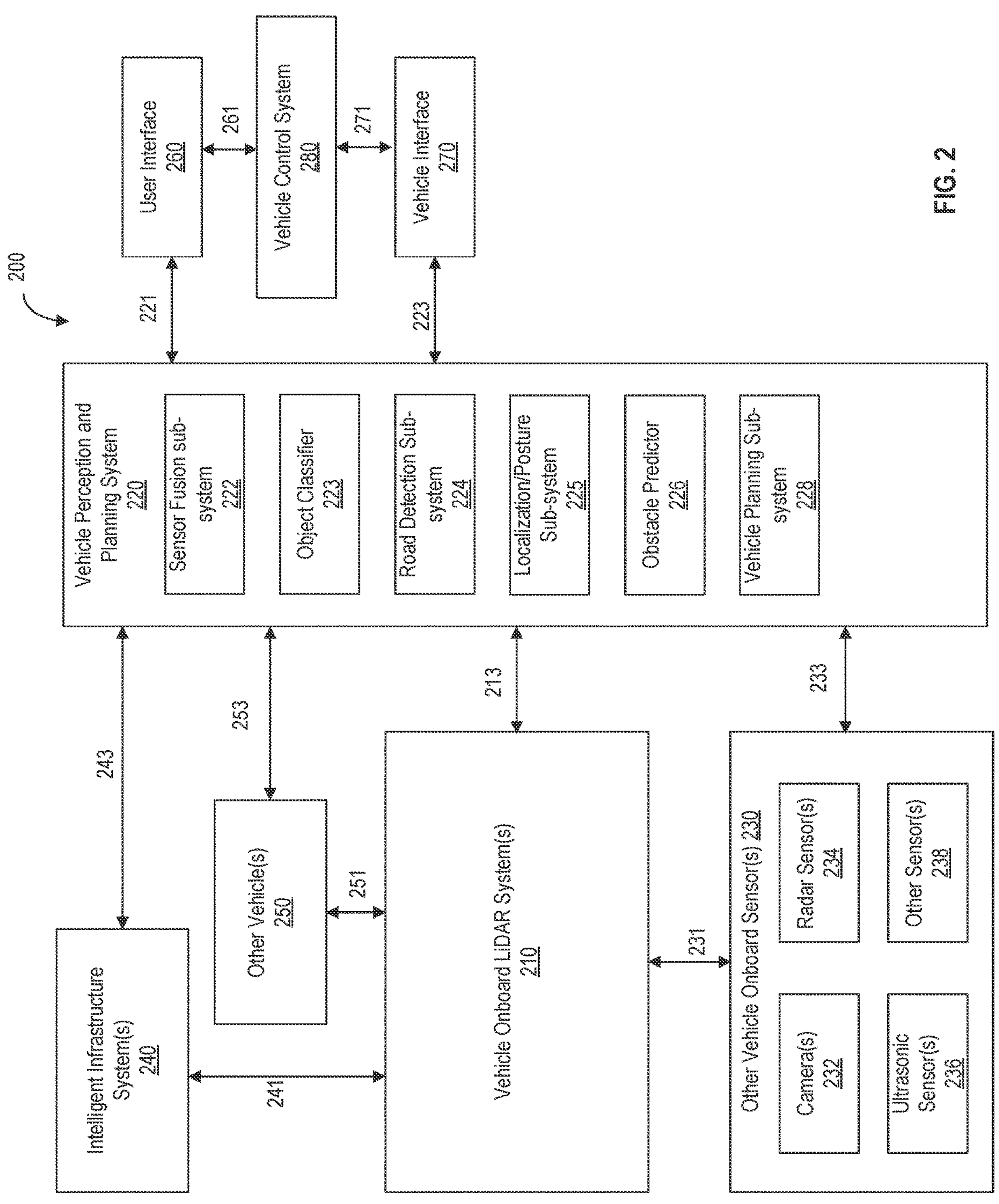
FIG. 2 is a block diagram illustrating interactions between an example LiDAR system and multiple other systems including a vehicle perception and planning system.

FIG. 2 is a block diagram 200 illustrating interactions between vehicle onboard LiDAR system(s) 210 and multiple other systems including a vehicle perception and planning system 220. LiDAR system(s) 210 can be mounted on or integrated to a vehicle. LiDAR system(s) 210 include sensor(s) that scan laser light to the surrounding environment to measure the distance, angle, and/or velocity of objects. Based on the scattered light that returned to LiDAR system(s) 210, it can generate sensor data (e.g., image data or 3D point cloud data) representing the perceived external environment.

LiDAR system(s) 210 can include one or more of short-range LiDAR sensors, medium-range LiDAR sensors, and long-range LiDAR sensors. A short-range LiDAR sensor measures objects located up to about 20-40 meters from the LiDAR sensor. Short-range LiDAR sensors can be used for, e.g., monitoring nearby moving objects (e.g., pedestrians crossing street in a school zone), parking assistance applications, or the like. A medium-range LiDAR sensor measures objects located up to about 100-150 meters from the LiDAR sensor. Medium-range LiDAR sensors can be used for, e.g., monitoring road intersections, assistance for merging onto or leaving a freeway, or the like. A long-range LiDAR sensor measures objects located up to about 150-300 meters. Long-range LiDAR sensors are typically used when a vehicle is travelling at high speed (e.g., on a freeway), such that the vehicle's control systems may only have a few seconds (e.g., 6-8 seconds) to respond to any situations detected by the LiDAR sensor. As shown in FIG. 2, in one embodiment, the LiDAR sensor data can be provided to vehicle perception and planning system 220 via a communication path 213 for further processing and controlling the vehicle operations. Communication path 213 can be any wired or wireless communication links that can transfer data.

With reference still to FIG. 2, in some embodiments, other vehicle onboard sensor(s) 230 are used to provide additional sensor data separately or together with LiDAR system(s) 210. Other vehicle onboard sensors 230 may include, for example, one or more camera(s) 232, one or more radar(s) 234, one or more ultrasonic sensor(s) 236, and/or other sensor(s) 238. Camera(s) 232 can take images and/or videos of the external environment of a vehicle. Camera(s) 232 can take, for example, high-definition (HD) videos having millions of pixels in each frame. A camera produces monochrome or color images and videos. Color information may be important in interpreting data for some situations (e.g., interpreting images of traffic lights). Color information may not be available from other sensors such as LiDAR or radar sensors. Camera(s) 232 can include one or more of narrow-focus cameras, wider-focus cameras, side-facing cameras, infrared cameras, fisheye cameras, or the like. The image and/or video data generated by camera(s) 232 can also be provided to vehicle perception and planning system 220 via communication path 233 for further processing and controlling the vehicle operations. Communication path 233 can be any wired or wireless communication links that can transfer data.

Other vehicle onboard sensos(s) 230 can also include radar sensor(s) 234. Radar sensor(s) 234 use radio waves to determine the range, angle, and velocity of objects. Radar sensor(s) 234 produce electromagnetic waves in the radio or microwave spectrum. The electromagnetic waves reflect off an object and some of the reflected waves return to the radar sensor, thereby providing information about the object's position and velocity. Radar sensor(s) 234 can include one or more of short-range radar(s), medium-range radar(s), and long-range radar(s). A short-range radar measures objects located at about 0.1-30 meters from the radar. A short-range radar is useful in detecting objects located nearby the vehicle, such as other vehicles, buildings, walls, pedestrians, bicyclists, etc. A short-range radar can be used to detect a blind spot, assist in lane changing, provide rear-end collision warning, assist in parking, provide emergency braking, or the like. A medium-range radar measures objects located at about 30-80 meters from the radar. A long-range radar measures objects located at about 80-200 meters. Medium- and/or long-range radars can be useful in, for example, traffic following, adaptive cruise control, and/or highway automatic braking. Sensor data generated by radar sensor(s) 234 can also be provided to vehicle perception and planning system 220 via communication path 233 for further processing and controlling the vehicle operations.

Other vehicle onboard sensor(s) 230 can also include ultrasonic sensor(s) 236. Ultrasonic sensor(s) 236 use acoustic waves or pulses to measure object located external to a vehicle. The acoustic waves generated by ultrasonic sensor(s) 236 are transmitted to the surrounding environment. At least some of the transmitted waves are reflected off an object and return to the ultrasonic sensor(s) 236. Based on the return signals, a distance of the object can be calculated. Ultrasonic sensor(s) 236 can be useful in, for example, check blind spot, identify parking spots, provide lane changing assistance into traffic, or the like. Sensor data generated by ultrasonic sensor(s) 236 can also be provided to vehicle perception and planning system 220 via communication path 233 for further processing and controlling the vehicle operations.

In some embodiments, one or more other sensor(s) 238 may be attached in a vehicle and may also generate sensor data. Other sensor(s) 238 may include, for example, global positioning systems (GPS), inertial measurement units (IMU), or the like. Sensor data generated by other sensor(s) 238 can also be provided to vehicle perception and planning system 220 via communication path 233 for further processing and controlling the vehicle operations. It is understood that communication path 233 may include one or more communication links to transfer data between the various sensor(s) 230 and vehicle perception and planning system 220.

In some embodiments, as shown in FIG. 2, sensor data from other vehicle onboard sensor(s) 230 can be provided to vehicle onboard LiDAR system(s) 210 via communication path 231. LiDAR system(s) 210 may process the sensor data from other vehicle onboard sensor(s) 230. For example, sensor data from camera(s) 232, radar sensor(s) 234, ultrasonic sensor(s) 236, and/or other sensor(s) 238 may be correlated or fused with sensor data LiDAR system(s) 210, thereby at least partially offloading the sensor fusion process performed by vehicle perception and planning system 220. It is understood that other configurations may also be implemented for transmitting and processing sensor data from the various sensors (e.g., data can be transmitted to a cloud service for processing and then the processing results can be transmitted back to the vehicle perception and planning system 220).

With reference still to FIG. 2, in some embodiments, sensors onboard other vehicle(s) 250 are used to provide additional sensor data separately or together with LiDAR system(s) 210. For example, two or more nearby vehicles may have their own respective LiDAR sensor(s), camera(s), radar sensor(s), ultrasonic sensor(s), etc. Nearby vehicles can communicate and share sensor data with one another. Communications between vehicles are also referred to as V2V (vehicle to vehicle) communications. For example, as shown in FIG. 2, sensor data generated by other vehicle(s) 250 can be communicated to vehicle perception and planning system 220 and/or vehicle onboard LiDAR system(s) 210, via communication path 253 and/or communication path 251, respectively. Communication paths 253 and 251 can be any wired or wireless communication links that can transfer data.

Sharing sensor data facilitates a better perception of the environment external to the vehicles. For instance, a first vehicle may not sense a pedestrian that is a behind a second vehicle but is approaching the first vehicle. The second vehicle may share the sensor data related to this pedestrian with the first vehicle such that the first vehicle can have additional reaction time to avoid collision with the pedestrian. In some embodiments, similar to data generated by sensor(s) 230, data generated by sensors onboard other vehicle(s) 250 may be correlated or fused with sensor data generated by LiDAR system(s) 210, thereby at least partially offloading the sensor fusion process performed by vehicle perception and planning system 220.

In some embodiments, intelligent infrastructure system(s) 240 are used to provide sensor data separately or together with LiDAR system(s) 210. Certain infrastructures may be configured to communicate with a vehicle to convey information and vice versa. Communications between a vehicle and infrastructures are generally referred to as V2I (vehicle to infrastructure) communications. For example, intelligent infrastructure system(s) 240 may include an intelligent traffic light that can convey its status to an approaching vehicle in a message such as "changing to yellow in 5 seconds." Intelligent infrastructure system(s) 240 may also include its own LiDAR system mounted near an intersection such that it can convey traffic monitoring information to a vehicle. For example, a left-turning vehicle at an intersection may not have sufficient sensing capabilities because some of its own sensors may be blocked by traffics in the opposite direction. In such a situation, sensors of intelligent infrastructure system(s) 240 can provide useful, and sometimes vital, data to the left-turning vehicle. Such data may include, for example, traffic conditions, information of objects in the direction the vehicle is turning to, traffic light status and predictions, or the like. These sensor data generated by intelligent infrastructure system(s) 240 can be provided to vehicle perception and planning system 220 and/or vehicle onboard LiDAR system(s) 210, via communication paths 243 and/or 241, respectively. Communication paths 243 and/or 241 can include any wired or wireless communication links that can transfer data. For example, sensor data from intelligent infrastructure system(s) 240 may be transmitted to LiDAR system(s) 210 and correlated or fused with sensor data generated by LiDAR system(s) 210, thereby at least partially offloading the sensor fusion process performed by vehicle perception and planning system 220. V2V and V2I communications described above are examples of vehicle-to-X (V2X) communications, where the "X" represents any other devices, systems, sensors, infrastructure, or the like that can share data with a vehicle.

With reference still to FIG. 2, via various communication paths, vehicle perception and planning system 220 receives sensor data from one or more of LiDAR system(s) 210, other vehicle onboard sensor(s) 230, other vehicle(s) 250, and/or intelligent infrastructure system(s) 240. In some embodiments, different types of sensor data are correlated and/or integrated by a sensor fusion sub-system 222. For example, sensor fusion sub-system 222 can generate a 360-degree model using multiple images or videos captured by multiple cameras disposed at different positions of the vehicle. Sensor fusion sub-system 222 obtains sensor data from different types of sensors and uses the combined data to perceive the environment more accurately. For example, a vehicle onboard camera 232 may not capture a clear image because it is facing the sun or a light source (e.g., another vehicle's headlight during nighttime) directly. A LiDAR system 210 may not be affected as much and therefore sensor fusion sub-system 222 can combine sensor data provided by both camera 232 and LiDAR system 210, and use the sensor data provided by LiDAR system 210 to compensate the unclear image captured by camera 232. As another example, in a rainy or foggy weather, a radar sensor 234 may work better than a camera 232 or a LiDAR system 210. Accordingly, sensor fusion sub-system 222 may use sensor data provided by the radar sensor 234 to compensate the sensor data provided by camera 232 or LiDAR system 210.

In other examples, sensor data generated by other vehicle onboard sensor(s) 230 may have a lower resolution (e.g., radar sensor data) and thus may need to be correlated and confirmed by LiDAR system(s) 210, which usually has a higher resolution. For example, a sewage cover (also referred to as a manhole cover) may be detected by radar sensor 234 as an object towards which a vehicle is approaching. Due to the low-resolution nature of radar sensor 234, vehicle perception and planning system 220 may not be able to determine whether the object is an obstacle that the vehicle needs to avoid. High-resolution sensor data generated by LiDAR system(s) 210 thus can be used to correlated and confirm that the object is a sewage cover and causes no harm to the vehicle.

Vehicle perception and planning system 220 further comprises an object classifier 223. Using raw sensor data and/or correlated/fused data provided by sensor fusion sub-system 222, object classifier 223 can detect and classify the objects and estimate the positions of the objects. In some embodiments, object classifier 233 can use machine-learning based techniques to detect and classify objects. Examples of the machine-learning based techniques include utilizing algorithms such as region-based convolutional neural networks (R-CNN), Fast R-CNN, Faster R-CNN, histogram of oriented gradients (HOG), region-based fully convolutional network (R-FCN), single shot detector (SSD), spatial pyramid pooling (SPP-net), and/or You Only Look Once (Yolo).

Vehicle perception and planning system 220 further comprises a road detection sub-system 224. Road detection sub-system 224 localizes the road and identifies objects and/or markings on the road. For example, based on raw or fused sensor data provided by radar sensor(s) 234, camera(s) 232, and/or LiDAR system(s) 210, road detection sub-system 224 can build a 3D model of the road based on machine-learning techniques (e.g., pattern recognition algorithms for identifying lanes). Using the 3D model of the road, road detection sub-system 224 can identify objects (e.g., obstacles or debris on the road) and/or markings on the road (e.g., lane lines, turning marks, crosswalk marks, or the like).

Vehicle perception and planning system 220 further comprises a localization and vehicle posture sub-system 225. Based on raw or fused sensor data, localization and vehicle posture sub-system 225 can determine position of the vehicle and the vehicle's posture. For example, using sensor data from LiDAR system(s) 210, camera(s) 232, and/or GPS data, localization and vehicle posture sub-system 225 can determine an accurate position of the vehicle on the road and the vehicle's six degrees of freedom (e.g., whether the vehicle is moving forward or backward, up or down, and left or right). In some embodiments, high-definition (HD) maps are used for vehicle localization. HD maps can provide highly detailed, three-dimensional, computerized maps that pinpoint a vehicle's location. For instance, using the HD maps, localization and vehicle posture sub-system 225 can determine precisely the vehicle's current position (e.g., which lane of the road the vehicle is currently in, how close it is to a curb or a sidewalk) and predict vehicle's future positions.

Vehicle perception and planning system 220 further comprises obstacle predictor 226. Objects identified by object classifier 223 can be stationary (e.g., a light pole, a road sign) or dynamic (e.g., a moving pedestrian, bicycle, another car). For moving objects, predicting their moving path or future positions can be important to avoid collision. Obstacle predictor 226 can predict an obstacle trajectory and/or warn the driver or the vehicle planning sub-system 228 about a potential collision. For example, if there is a high likelihood that the obstacle's trajectory intersects with the vehicle's current moving path, obstacle predictor 226 can generate such a warning. Obstacle predictor 226 can use a variety of techniques for making such a prediction. Such techniques include, for example, constant velocity or acceleration models, constant turn rate and velocity/acceleration models, Kalman Filter and Extended Kalman Filter based models, recurrent neural network (RNN) based models, long short-term memory (LSTM) neural network based models, encoder-decoder RNN models, or the like.

With reference still to FIG. 2, in some embodiments, vehicle perception and planning system 220 further comprises vehicle planning sub-system 228. Vehicle planning sub-system 228 can include a route planner, a driving behaviors planner, and a motion planner. The route planner can plan the route of a vehicle based on the vehicle's current location data, target location data, traffic information, etc. The driving behavior planner adjusts the timing and planned movement based on how other objects might move, using the obstacle prediction results provided by obstacle predictor 226. The motion planner determines the specific operations the vehicle needs to follow. The planning results are then communicated to vehicle control system 280 via vehicle interface 270. The communication can be performed through communication paths 223 and 271, which include any wired or wireless communication links that can transfer data.

Vehicle control system 280 controls the vehicle's steering mechanism, throttle, brake, etc., to operate the vehicle according to the planned route and movement. Vehicle perception and planning system 220 may further comprise a user interface 260, which provides a user (e.g., a driver) access to vehicle control system 280 to, for example, override or take over control of the vehicle when necessary. User interface 260 can communicate with vehicle perception and planning system 220, for example, to obtain and display raw or fused sensor data, identified objects, vehicle's location/posture, etc. These displayed data can help a user to better operate the vehicle. User interface 260 can communicate with vehicle perception and planning system 220 and/or vehicle control system 280 via communication paths 221 and 261 respectively, which include any wired or wireless communication links that can transfer data. It is understood that the various systems, sensors, communication links, and interfaces in FIG. 2 can be configured in any desired manner and not limited to the configuration shown in FIG. 2.

Figure 3:
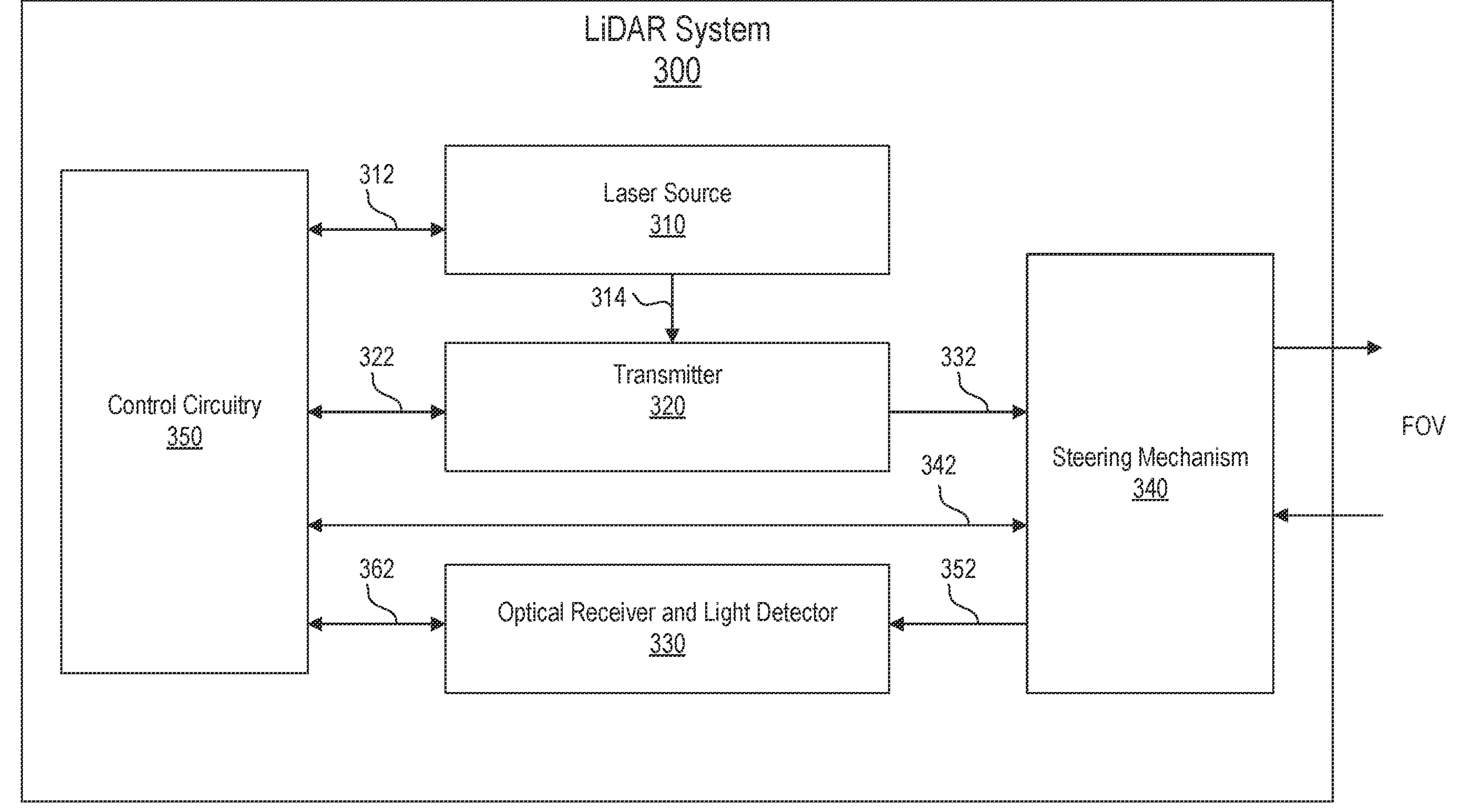
FIG. 3 is a block diagram illustrating an example LiDAR system.

FIG. 3 is a block diagram illustrating an exemplary LiDAR system 300. LiDAR system 300 can be used to implement LiDAR system 110, 120A-F, and/or 210 shown in FIGS. 1 and 2. In one embodiment, LiDAR system 300 comprises a laser source 310, a transmitter 320, an optical receiver and light detector 330, a steering system 340, and a control circuitry 350. These components are coupled together using communications paths 312, 314, 322, 332, 343, 352, and 362. These communications paths include communication links (wired or wireless, bidirectional or unidirectional) among the various LiDAR system components, but need not be physical components themselves. While the communications paths can be implemented by one or more electrical wires, buses, or optical fibers, the communication paths can also be wireless channels or free-space optical paths so that no physical communication medium is present. For example, in one embodiment of LiDAR system 300, communication path 314 between laser source 310 and transmitter 320 may be implemented using one or more optical fibers. Communication paths 332 and 352 may represent optical paths implemented using free space optical components and/or optical fibers. And communication paths 312, 322, 342, and 362 may be implemented using one or more electrical wires that carry electrical signals. The communications paths can also include one or more of the above types of communication mediums (e.g., they can include an optical fiber and a free-space optical component, or include one or more optical fibers and one or more electrical wires).

LiDAR system 300 can also include other components not depicted in FIG. 3, such as power buses, power supplies, LED indicators, switches, etc. Additionally, other communication connections among components may be present, such as a direct connection between light source 310 and optical receiver and light detector 330 to provide a reference signal so that the time from when a light pulse is transmitted until a return light pulse is detected can be accurately measured.

Laser source 310 outputs laser light for illuminating objects in a field of view (FOV). Laser source 310 can be, for example, a semiconductor-based laser (e.g., a diode laser) and/or a fiber-based laser. A semiconductor-based laser can be, for example, an edge emitting laser (EEL), a vertical cavity surface emitting laser (VCSEL), or the like. A fiber-based laser is a laser in which the active gain medium is an optical fiber doped with rare-earth elements such as erbium, ytterbium, neodymium, dysprosium, praseodymium, thulium and/or holmium. In some embodiments, a fiber laser is based on double-clad fibers, in which the gain medium forms the core of the fiber surrounded by two layers of cladding. The double-clad fiber allows the core to be pumped with a high-power beam, thereby enabling the laser source to be a high-power fiber laser source.

In some embodiments, laser source 310 comprises a master oscillator (also referred to as a seed laser) and power amplifier (MOPA). The power amplifier amplifies the output power of the seed laser. The power amplifier can be a fiber amplifier, a bulk amplifier, or a semiconductor optical amplifier. The seed laser can be a diode laser (e.g., a Fabry-Perot cavity laser, a distributed feedback laser), a solid-state bulk laser, or a tunable external-cavity diode laser. In some embodiments, laser source 310 can be an optically pumped microchip laser. Microchip lasers are alignment-free monolithic solid-state lasers where the laser crystal is directly contacted with the end mirrors of the laser resonator. A microchip laser is typically pumped with a laser diode (directly or using a fiber) to obtain the desired output power. A microchip laser can be based on neodymium-doped yttrium aluminum garnet ($Y_3Al_5O_{12}$) laser crystals (i.e., Nd:YAG), or neodymium-doped vanadate (i.e., ND:$YVO_4$) laser crystals.

Figure 4:
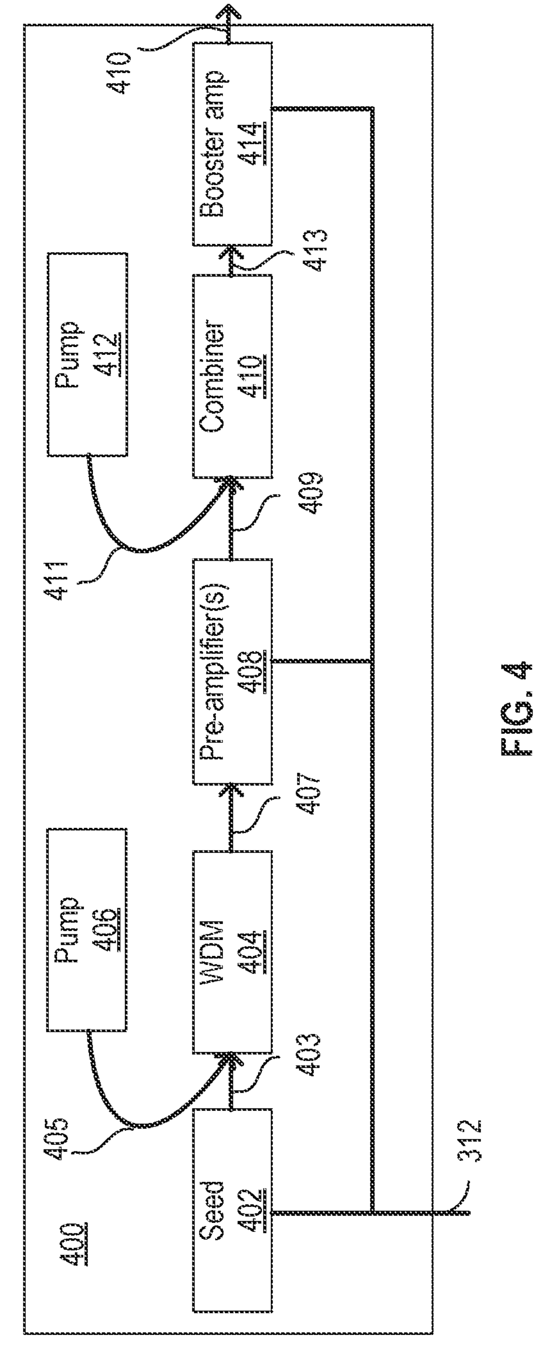
FIG. 4 is a block diagram illustrating an example fiber-based laser source.

FIG. 4 is a block diagram illustrating an exemplary fiber-based laser source 400 having a seed laser and one or more pumps (e.g., laser diodes) for pumping desired output power. Fiber-based laser source 400 is an example of laser source 310 depicted in FIG. 3. In some embodiments, fiber-based laser source 400 comprises a seed laser 402 to generate initial light pulses of one or more wavelengths (e.g., 1550 nm), which are provided to a wavelength-division multiplexor (WDM) 404 via an optical fiber 403. Fiber-based laser source 400 further comprises a pump 406 for providing laser power (e.g., of a different wavelength, such as 980 nm) to WDM 404 via an optical fiber 405. WDM 404 multiplexes the light pulses provided by seed laser 402 and the laser power provided by pump 406 onto a single optical fiber 407. The output of WDM 404 can then be provided to one or more pre-amplifier(s) 408 via optical fiber 407. Pre-amplifier(s) 408 can be optical amplifier(s) that amplify optical signals (e.g., with about 20-30 dB gain). In some embodiments, pre-amplifier(s) 408 are low noise amplifiers. Pre-amplifier(s) 408 output to a combiner 410 via an optical fiber 409. Combiner 410 combines the output laser light of pre-amplifier(s) 408 with the laser power provided by pump 412 via an optical fiber 411. Combiner 410 can combine optical signals having the same wavelength or different wavelengths. One example of a combiner is a WDM. Combiner 410 provides pulses to a booster amplifier 414, which produces output light pulses via optical fiber 410. The booster amplifier 414 provides further amplification of the optical signals. The outputted light pulses can then be transmitted to transmitter 320 and/or steering mechanism 340 (shown in FIG. 3). It is understood that FIG. 4 illustrates one exemplary configuration of fiber-based laser source 400. Laser source 400 can have many other configurations using different combinations of one or more components shown in FIG. 4 and/or other components not shown in FIG. 4 (e.g., other components such as power supplies, lens, filters, splitters, combiners, etc.).

In some variations, fiber-based laser source 400 can be controlled (e.g., by control circuitry 350) to produce pulses of different amplitudes based on the fiber gain profile of the fiber used in fiber-based laser source 400. Communication path 312 couples fiber-based laser source 400 to control circuitry 350 (shown in FIG. 3) so that components of fiber-based laser source 400 can be controlled by or otherwise communicate with control circuitry 350. Alternatively, fiber-based laser source 400 may include its own dedicated controller. Instead of control circuitry 350 communicating directly with components of fiber-based laser source 400, a dedicated controller of fiber-based laser source 400 communicates with control circuitry 350 and controls and/or communicates with the components of fiber-based light source 400. Fiber-based light source 400 can also include other components not shown, such as one or more power connectors, power supplies, and/or power lines.

Referencing FIG. 3, typical operating wavelengths of laser source 310 comprise, for example, about 850 nm, about 905 nm, about 940 nm, about 1064 nm, and about 1550 nm. The upper limit of maximum usable laser power is set by the U.S. FDA (U.S. Food and Drug Administration) regulations. The optical power limit at 1550 nm wavelength is much higher than those of the other aforementioned wavelengths. Further, at 1550 nm, the optical power loss in a fiber is low. There characteristics of the 1550 nm wavelength make it more beneficial for long-range LiDAR applications. The amount of optical power output from laser source 310 can be characterized by its peak power, average power, and the pulse energy. The peak power is the ratio of pulse energy to the width of the pulse (e.g., full width at half maximum or FWHM). Thus, a smaller pulse width can provide a larger peak power for a fixed amount of pulse energy. A pulse width can be in the range of nanosecond or picosecond. The average power is the product of the energy of the pulse and the pulse repetition rate (PRR). As described in more detail below, the PRR represents the frequency of the pulsed laser light. The PRR typically corresponds to the maximum range that a LiDAR system can measure. Laser source 310 can be configured to produce pulses at high PRR to meet the desired number of data points in a point cloud generated by the LiDAR system. Laser source 310 can also be configured to produce pulses at medium or low PRR to meet the desired maximum detection distance. Wall plug efficiency (WPE) is another factor to evaluate the total power consumption, which may be a key indicator in evaluating the laser efficiency. For example, as shown in FIG. 1, multiple LiDAR systems may be attached to a vehicle, which may be an electrical-powered vehicle or a vehicle otherwise having limited fuel or battery power supply. Therefore, high WPE and intelligent ways to use laser power are often among the important considerations when selecting and configuring laser source 310 and/or designing laser delivery systems for vehicle-mounted LiDAR applications.

It is understood that the above descriptions provide non-limiting examples of a laser source 310. Laser source 310 can be configured to include many other types of light sources (e.g., laser diodes, short-cavity fiber lasers, solid-state lasers, and/or tunable external cavity diode lasers) that are configured to generate one or more light signals at various wavelengths. In some examples, light source 310 comprises amplifiers (e.g., pre-amplifiers and/or booster amplifiers), which can be a doped optical fiber amplifier, a solid-state bulk amplifier, and/or a semiconductor optical amplifier. The amplifiers are configured to receive and amplify light signals with desired gains.

With reference back to FIG. 3, LiDAR system 300 further comprises a transmitter 320. Laser source 310 provides laser light (e.g., in the form of a laser beam) to transmitter 320. The laser light provided by laser source 310 can be amplified laser light with a predetermined or controlled wavelength, pulse repetition rate, and/or power level. Transmitter 320 receives the laser light from laser source 310 and transmits the laser light to steering mechanism 340 with low divergence. In some embodiments, transmitter 320 can include, for example, optical components (e.g., lens, fibers, mirrors, etc.) for transmitting laser beams to a field-of-view (FOV) directly or via steering mechanism 340. While FIG. 3 illustrates transmitter 320 and steering mechanism 340 as separate components, they may be combined or integrated as one system in some embodiments. Steering mechanism 340 is described in more detail below.

Laser beams provided by laser source 310 may diverge as they travel to transmitter 320. Therefore, transmitter 320 often comprises a collimating lens configured to collect the diverging laser beams and produce more parallel optical beams with reduced or minimum divergence. The collimated optical beams can then be further directed through various optics such as mirrors and lens. A collimating lens may be, for example, a single plano-convex lens or a lens group. The collimating lens can be configured to achieve any desired properties such as the beam diameter, divergence, numerical aperture, focal length, or the like. A beam propagation ratio or beam quality factor (also referred to as the $M^2$ factor) is used for measurement of laser beam quality. In many LiDAR applications, it is important to have good laser beam quality in the generated transmitting laser beam. The $M^2$ factor represents a degree of variation of a beam from an ideal Gaussian beam. Thus, the $M^2$ factor reflects how well a collimated laser beam can be focused on a small spot, or how well a divergent laser beam can be collimated. Therefore, laser source 310 and/or transmitter 320 can be configured to meet, for example, scan resolution requirement while maintaining desired $M^2$ factor.

One or more of the light beams provided by transmitter 320 are scanned by steering mechanism 340 to a FOV. Steering mechanism 340 scans light beams in multiple dimensions (e.g., in both the horizontal and vertical dimension) to facilitate LiDAR system 300 to map the environment by generating a 3D point cloud. Steering mechanism 340 will be described in more detail below. The laser light scanned to an FOV may be scattered or reflected by an object in the FOV. At least a portion of the scattered or reflected light returns to LiDAR system 300. FIG. 3 further illustrates an optical receiver and light detector 330 configured to receive the return light. Optical receiver and light detector 330 comprises an optical receiver that is configured to collect the return light from the FOV. The optical receiver can include optics (e.g., lens, fibers, mirrors, etc.) for receiving, redirecting, focus, amplifying, and/or filtering return light from the FOV. For example, the optical receiver often includes a collection lens (e.g., a simple plano-convex lens or a lens group) to collect and/or focus the collected return light onto a light detector.

A light detector detects the return light focused by the optical receiver and generates current and/or voltage signals proportional to the incident intensity of the return light. Based on such current and/or voltage signals, the depth information of the object in the FOV can be derived. One exemplary method for deriving such depth information is based on the direct TOF (time of flight), which is described in more detail below. A light detector may be characterized by its detection sensitivity, quantum efficiency, detector bandwidth, linearity, signal to noise ratio (SNR), overload resistance, interference immunity, etc. Based on the applications, the light detector can be configured or customized to have any desired characteristics. For example, optical receiver and light detector 330 can be configured such that the light detector has a large dynamic range while having a good linearity. The light detector linearity indicates the detector's capability of maintaining linear relationship between input optical signal power and the detector's output. A detector having good linearity can maintain a linear relationship over a large dynamic input optical signal range.

To achieve desired detector characteristics, configurations or customizations can be made to the light detector's structure and/or the detector's material system. Various detector structure can be used for a light detector. For example, a light detector structure can be a PIN based structure, which has a undoped intrinsic semiconductor region (i.e., an "i" region) between a p-type semiconductor and an n-type semiconductor region. Other light detector structures comprise, for example, a APD (avalanche photodiode) based structure, a PMT (photomultiplier tube) based structure, a SiPM (Silicon photomultiplier) based structure, a SPAD (single-photon avalanche diode) base structure, and/or quantum wires. For material systems used in a light detector, Si, InGaAs, and/or Si/Ge based materials can be used. It is understood that many other detector structures and/or material systems can be used in optical receiver and light detector 330.

A light detector (e.g., an APD based detector) may have an internal gain such that the input signal is amplified when generating an output signal. However, noise may also be amplified due to the light detector's internal gain. Common types of noise include signal shot noise, dark current shot noise, thermal noise, and amplifier noise (TIA). In some embodiments, optical receiver and light detector 330 may include a pre-amplifier that is a low noise amplifier (LNA). In some embodiments, the pre-amplifier may also include a TIA-transimpedance amplifier, which converts a current signal to a voltage signal. For a linear detector system, input equivalent noise or noise equivalent power (NEP) measures how sensitive the light detector is to weak signals. Therefore, they can be used as indicators of the overall system performance. For example, the NEP of a light detector specifies the power of the weakest signal that can be detected and therefore it in turn specifies the maximum range of a LiDAR system. It is understood that various light detector optimization techniques can be used to meet the requirement of LiDAR system 300. Such optimization techniques may include selecting different detector structures, materials, and/or implement signal processing techniques (e.g., filtering, noise reduction, amplification, or the like). For example, in addition to or instead of using direct detection of return signals (e.g., by using TOF), coherent detection can also be used for a light detector. Coherent detection allows for detecting amplitude and phase information of the received light by interfering the received light with a local oscillator. Coherent detection can improve detection sensitivity and noise immunity.

FIG. 3 further illustrates that LiDAR system 300 comprises steering mechanism 340. As described above, steering mechanism 340 directs light beams from transmitter 320 to scan an FOV in multiple dimensions. A steering mechanism is referred to as a raster mechanism or a scanning mechanism. Scanning light beams in multiple directions (e.g., in both the horizontal and vertical directions) facilitates a LiDAR system to map the environment by generating an image or a 3D point cloud. A steering mechanism can be based on mechanical scanning and/or solid-state scanning. Mechanical scanning uses rotating mirrors to steer the laser beam or physically rotate the LiDAR transmitter and receiver (collectively referred to as transceiver) to scan the laser beam. Solid-state scanning directs the laser beam to various positions through the FOV without mechanically moving any macroscopic components such as the transceiver. Solid-state scanning mechanisms include optical phased arrays based steering and flash LiDAR based steering. In some embodiments, because solid-state scanning mechanisms do not physically move macroscopic components, the steering performed by a solid-state scanning mechanism may be referred to as effective steering. A LiDAR system using solid-state scanning may also be referred to as a non-mechanical scanning or simply non-scanning LiDAR system (a flash LiDAR system is an exemplary non-scanning LiDAR system).

Steering mechanism 340 can be used with the transceiver (e.g., transmitter 320 and optical receiver and light detector 330) to scan the FOV for generating an image or a 3D point cloud. As an example, to implement steering mechanism 340, a two-dimensional mechanical scanner can be used with a single-point or several single-point transceivers. A single-point transceiver transmits a single light beam or a small number of light beams (e.g., 2-8 beams) to the steering mechanism. A two-dimensional mechanical steering mechanism comprises, for example, polygon mirror(s), oscillating mirror(s), rotating prism(s), rotating tilt mirror surface(s), or a combination thereof. In some embodiments, steering mechanism 340 may include non-mechanical steering mechanism(s) such as solid-state steering mechanism(s). For example, steering mechanism 340 can be based on tuning wavelength of the laser light combined with refraction effect, and/or based on reconfigurable grating/phase array. In some embodiments, steering mechanism 340 can use a single scanning device to achieve two-dimensional scanning or two devices combined to realize two-dimensional scanning.

As another example, to implement steering mechanism 340, a one-dimensional mechanical scanner can be used with an array or a large number of single-point transceivers. Specifically, the transceiver array can be mounted on a rotating platform to achieve 360-degree horizontal field of view. Alternatively, a static transceiver array can be combined with the one-dimensional mechanical scanner. A one-dimensional mechanical scanner comprises polygon mirror(s), oscillating mirror(s), rotating prism(s), rotating tilt mirror surface(s) for obtaining a forward-looking horizontal field of view. Steering mechanisms using mechanical scanners can provide robustness and reliability in high volume production for automotive applications.

As another example, to implement steering mechanism 340, a two-dimensional transceiver can be used to generate a scan image or a 3D point cloud directly. In some embodiments, a stitching or micro shift method can be used to improve the resolution of the scan image or the field of view being scanned. For example, using a two-dimensional transceiver, signals generated at one direction (e.g., the horizontal direction) and signals generated at the other direction (e.g., the vertical direction) may be integrated, interleaved, and/or matched to generate a higher or full resolution image or 3D point cloud representing the scanned FOV.

Some implementations of steering mechanism 340 comprise one or more optical redirection elements (e.g., mirrors or lens) that steer return light signals (e.g., by rotating, vibrating, or directing) along a receive path to direct the return light signals to optical receiver and light detector 330. The optical redirection elements that direct light signals along the transmitting and receiving paths may be the same components (e.g., shared), separate components (e.g., dedicated), and/or a combination of shared and separate components. This means that in some cases the transmitting and receiving paths are different although they may partially overlap (or in some cases, substantially overlap).

With reference still to FIG. 3, LiDAR system 300 further comprises control circuitry 350. Control circuitry 350 can be configured and/or programmed to control various parts of the LiDAR system 300 and/or to perform signal processing.

In a typical system, control circuitry 350 can be configured and/or programmed to perform one or more control operations including, for example, controlling laser source 310 to obtain desired laser pulse timing, repetition rate, and power; controlling steering mechanism 340 (e.g., controlling the speed, direction, and/or other parameters) to scan the FOV and maintain pixel registration/alignment; controlling optical receiver and light detector 330 (e.g., controlling the sensitivity, noise reduction, filtering, and/or other parameters) such that it is an optimal state; and monitoring overall system health/status for functional safety.

Control circuitry 350 can also be configured and/or programmed to perform signal processing to the raw data generated by optical receiver and light detector 330 to derive distance and reflectance information, and perform data packaging and communication to vehicle perception and planning system 220 (shown in FIG. 2). For example, control circuitry 350 determines the time it takes from transmitting a light pulse until a corresponding return light pulse is received; determines when a return light pulse is not received for a transmitted light pulse; determines the direction (e.g., horizontal and/or vertical information) for a transmitted/return light pulse; determines the estimated range in a particular direction; and/or determines any other type of data relevant to LiDAR system 300.

LiDAR system 300 can be disposed in a vehicle, which may operate in many different environments including hot or cold weather, rough road conditions that may cause intense vibration, high or low humidifies, dusty areas, etc. Therefore, in some embodiments, optical and/or electronic components of LiDAR system 300 (e.g., optics in transmitter 320, optical receiver and light detector 330, and steering mechanism 340) are disposed or configured in such a manner to maintain long term mechanical and optical stability. For example, components in LiDAR system 300 may be secured and sealed such that they can operate under all conditions a vehicle may encounter. As an example, an anti-moisture coating and/or hermetic sealing may be applied to optical components of transmitter 320, optical receiver and light detector 330, and steering mechanism 340 (and other components that are susceptible to moisture). As another example, housing(s), enclosure(s), and/or window can be used in LiDAR system 300 for providing desired characteristics such as hardness, ingress protection (IP) rating, self-cleaning capability, resistance to chemical and resistance to impact, or the like. In addition, efficient and economical methodologies for assembling LiDAR system 300 may be used to meet the LiDAR operating requirements while keeping the cost low.

It is understood by a person of ordinary skill in the art that FIG. 3 and the above descriptions are for illustrative purposes only, and a LiDAR system can include other functional units, blocks, or segments, and can include variations or combinations of these above functional units, blocks, or segments. For example, LiDAR system 300 can also include other components not depicted in FIG. 3, such as power buses, power supplies, LED indicators, switches, etc. Additionally, other connections among components may be present, such as a direct connection between light source 310 and optical receiver and light detector 330 so that light detector 330 can accurately measure the time from when light source 310 transmits a light pulse until light detector 330 detects a return light pulse.

These components shown in FIG. 3 are coupled together using communications paths 312, 314, 322, 332, 342, 352, and 362. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 314 includes one or more optical fibers; communication path 352 represents an optical path; and communication paths 312, 322, 342, and 362 are all electrical wires that carry electrical signals. The communication paths can also include more than one of the above types of communication mediums (e.g., they can include an optical fiber and an optical path, or one or more optical fibers and one or more electrical wires).

Figure 5A:
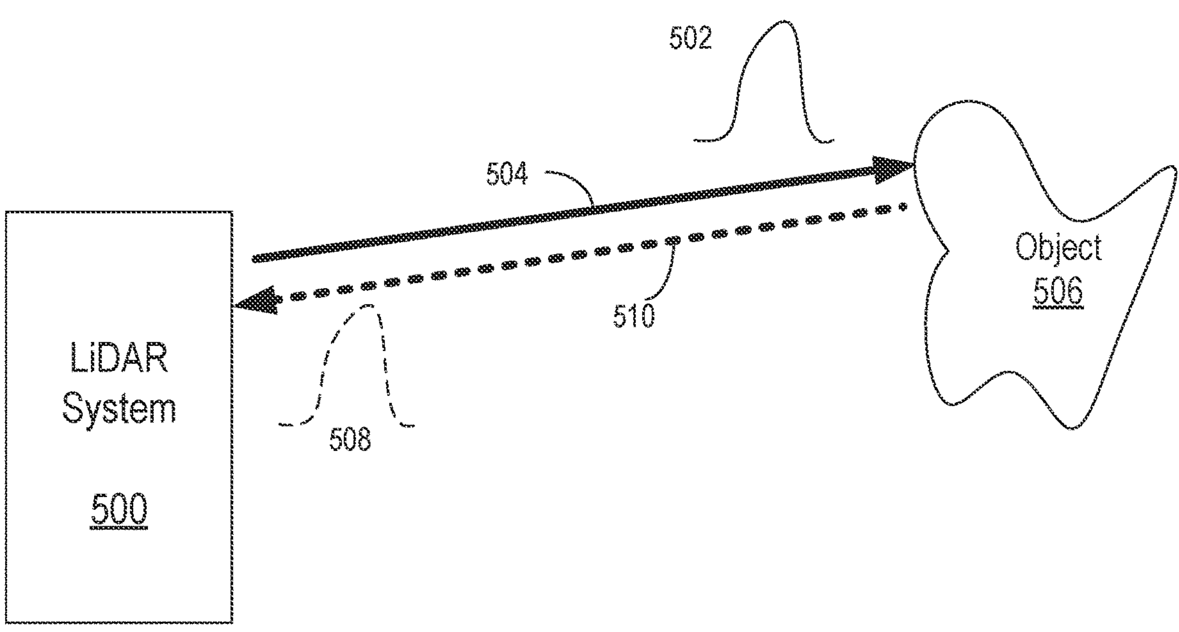
FIGS. 5A-5C illustrate an example LiDAR system using pulse signals to measure distances to objects disposed in a field-of-view (FOV).

As described above, some LiDAR systems use the time-of-flight (TOF) of light signals (e.g., light pulses) to determine the distance to objects in a light path. For example, with reference to FIG. 5A, an exemplary LiDAR system 500 includes a laser light source (e.g., a fiber laser), a steering system (e.g., a system of one or more moving mirrors), and a light detector (e.g., a photon detector with one or more optics). LiDAR system 500 can be implemented using, for example, LiDAR system 300 described above. LiDAR system 500 transmits a light pulse 502 along light path 504 as determined by the steering system of LiDAR system 500. In the depicted example, light pulse 502, which is generated by the laser light source, is a short pulse of laser light. Further, the signal steering system of the LiDAR system 500 is a pulsed-signal steering system. However, it should be appreciated that LiDAR systems can operate by generating, transmitting, and detecting light signals that are not pulsed and derive ranges to an object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulsed signals also may be applicable to LiDAR systems that do not use one or both of these techniques.

Referring back to FIG. 5A (e.g., illustrating a time-of-flight LiDAR system that uses light pulses), when light pulse 502 reaches object 506, light pulse 502 scatters or reflects to generate a return light pulse 508. Return light pulse 508 may return to system 500 along light path 510. The time from when transmitted light pulse 502 leaves LiDAR system 500 to when return light pulse 508 arrives back at LiDAR system 500 can be measured (e.g., by a processor or other electronics, such as control circuitry 350, within the LiDAR system). This time-of-flight combined with the knowledge of the speed of light can be used to determine the range/distance from LiDAR system 500 to the portion of object 506 where light pulse 502 scattered or reflected.

Figures 5B, 5C:
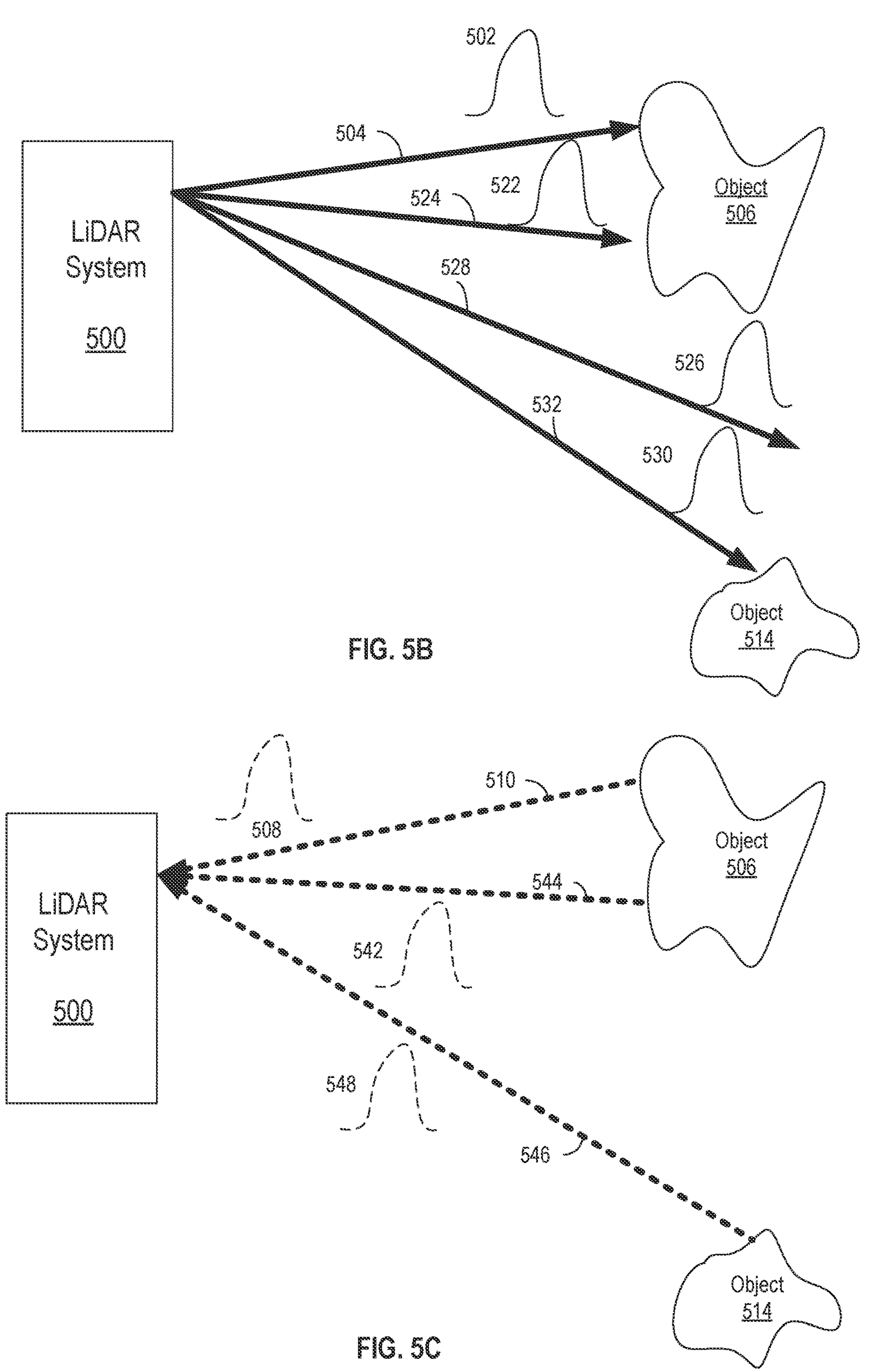

By directing many light pulses, as depicted in FIG. 5B, LiDAR system 500 scans the external environment (e.g., by directing light pulses 502, 522, 526, 530 along light paths 504, 524, 528, 532, respectively). As depicted in FIG. 5C, LiDAR system 500 receives return light pulses 508, 542, 548 (which correspond to transmitted light pulses 502, 522, 530, respectively). Return light pulses 508, 542, and 548 are generated by scattering or reflecting the transmitted light pulses by one of objects 506 and 514. Return light pulses 508, 542, and 548 may return to LiDAR system 500 along light paths 510, 544, and 546, respectively. Based on the direction of the transmitted light pulses (as determined by LiDAR system 500) as well as the calculated range from LiDAR system 500 to the portion of objects that scatter or reflect the light pulses (e.g., the portions of objects 506 and 514), the external environment within the detectable range (e.g., the field of view between path 504 and 532, inclusively) can be precisely mapped or plotted (e.g., by generating a 3D point cloud or images).

If a corresponding light pulse is not received for a particular transmitted light pulse, then it may be determined that there are no objects within a detectable range of LiDAR system 500 (e.g., an object is beyond the maximum scanning distance of LiDAR system 500). For example, in FIG. 5B, light pulse 526 may not have a corresponding return light pulse (as illustrated in FIG. 5C) because light pulse 526 may not produce a scattering event along its transmission path 528 within the predetermined detection range. LiDAR system 500, or an external system in communication with LiDAR system 500 (e.g., a cloud system or service), can interpret the lack of return light pulse as no object being disposed along light path 528 within the detectable range of LiDAR system 500.

In FIG. 5B, light pulses 502, 522, 526, and 530 can be transmitted in any order, serially, in parallel, or based on other timings with respect to each other. Additionally, while FIG. 5B depicts transmitted light pulses as being directed in one dimension or one plane (e.g., the plane of the paper), LiDAR system 500 can also direct transmitted light pulses along other dimension(s) or plane(s). For example, LiDAR system 500 can also direct transmitted light pulses in a dimension or plane that is perpendicular to the dimension or plane shown in FIG. 5B, thereby forming a 2-dimensional transmission of the light pulses. This 2-dimensional transmission of the light pulses can be point-by-point, line-by-line, all at once, or in some other manner. A point cloud or image from a 1-dimensional transmission of light pulses (e.g., a single horizontal line) can generate 2-dimensional data (e.g., (1) data from the horizontal transmission direction and (2) the range or distance to objects). Similarly, a point cloud or image from a 2-dimensional transmission of light pulses can generate 3-dimensional data (e.g., (1) data from the horizontal transmission direction, (2) data from the vertical transmission direction, and (3) the range or distance to objects). In general, a LiDAR system performing an n-dimensional transmission of light pulses generates (n+1) dimensional data. This is because the LiDAR system can measure the depth of an object or the range/distance to the object, which provides the extra dimension of data. Therefore, a 2D scanning by a LiDAR system can generate a 3D point cloud for mapping the external environment of the LiDAR system.

The density of a point cloud refers to the number of measurements (data points) per area performed by the LiDAR system. A point cloud density relates to the LiDAR scanning resolution. Typically, a larger point cloud density, and therefore a higher resolution, is desired at least for the region of interest (ROI). The density of points in a point cloud or image generated by a LiDAR system is equal to the number of pulses divided by the field of view. In some embodiments, the field of view can be fixed. Therefore, to increase the density of points generated by one set of transmission-receiving optics (or transceiver optics), the LiDAR system may need to generate a pulse more frequently. In other words, a light source with a higher pulse repetition rate (PRR) is needed. On the other hand, by generating and transmitting pulses more frequently, the farthest distance that the LiDAR system can detect may be limited. For example, if a return signal from a distant object is received after the system transmits the next pulse, the return signals may be detected in a different order than the order in which the corresponding signals are transmitted, thereby causing ambiguity if the system cannot correctly correlate the return signals with the transmitted signals.

To illustrate, consider an exemplary LiDAR system that can transmit laser pulses with a repetition rate between 500 kHz and 1 MHz. Based on the time it takes for a pulse to return to the LiDAR system and to avoid mix-up of return pulses from consecutive pulses in a conventional LiDAR design, the farthest distance the LiDAR system can detect may be 300 meters and 150 meters for 500 kHz and 1 MHz, respectively. The density of points of a LiDAR system with 500 kHz repetition rate is half of that with 1 MHz. Thus, this example demonstrates that, if the system cannot correctly correlate return signals that arrive out of order, increasing the repetition rate from 500 kHz to 1 MHz (and thus improving the density of points of the system) may reduce the detection range of the system. Various techniques are used to mitigate the tradeoff between higher PRR and limited detection range. For example, multiple wavelengths can be used for detecting objects in different ranges. Optical and/or signal processing techniques are also used to correlate between transmitted and return light signals.

Various systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Various systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers. Examples of client computers can include desktop computers, workstations, portable computers, cellular smartphones, tablets, or other types of computing devices.

Various systems, apparatus, and methods described herein may be implemented using a computer program product tangibly embodied in an information carrier, e.g., in a non-transitory machine-readable storage device, for execution by a programmable processor; and the method processes and steps described herein may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
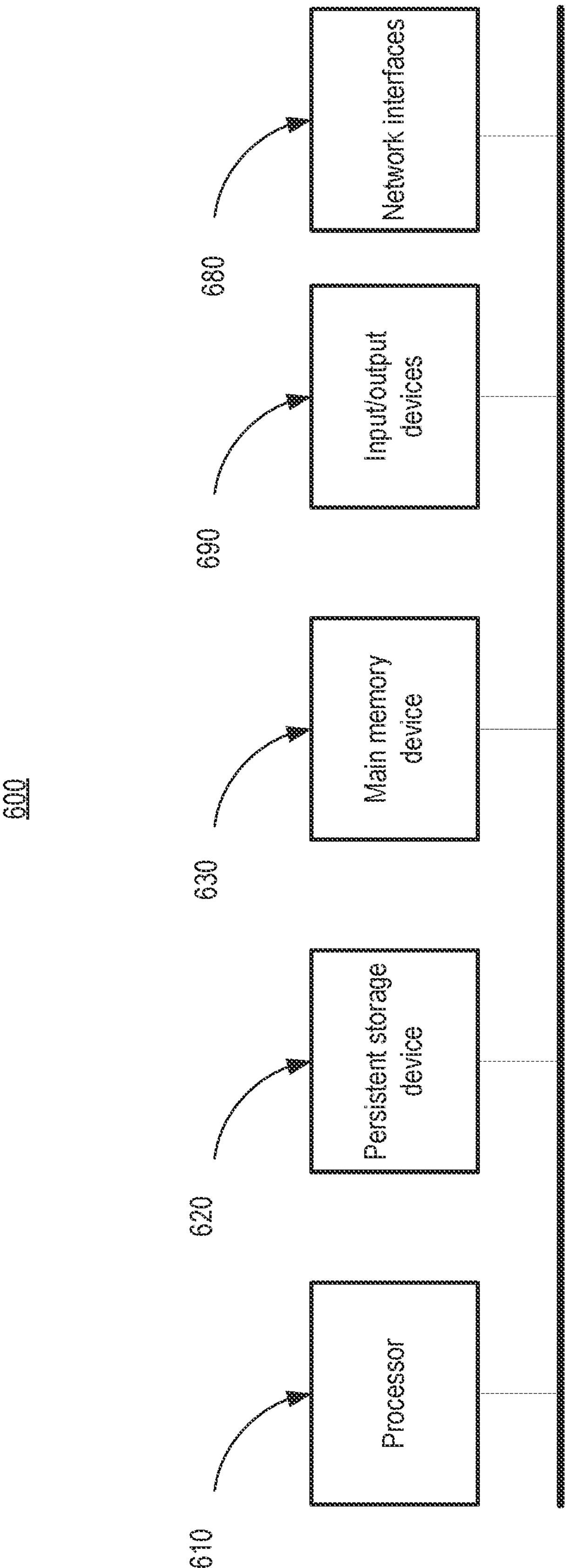
FIG. 6 is a block diagram illustrating an example apparatus used to implement systems, apparatus, and methods in various embodiments.

A high-level block diagram of an exemplary apparatus that may be used to implement systems, apparatus and methods described herein is illustrated in FIG. 6. Apparatus 600 comprises a processor 610 operatively coupled to a persistent storage device 620 and a main memory device 630. Processor 610 controls the overall operation of apparatus 600 by executing computer program instructions that define such operations. The computer program instructions may be stored in persistent storage device 620, or other computer-readable medium, and loaded into main memory device 630 when execution of the computer program instructions is desired. For example, processor 610 may be used to implement one or more components and systems described herein, such as control circuitry 350 (shown in FIG. 3), vehicle perception and planning system 220 (shown in FIG. 2), and vehicle control system 280 (shown in FIG. 2). Thus, the method steps described herein can be defined by the computer program instructions stored in main memory device 630 and/or persistent storage device 620 and controlled by processor 610 executing the computer program instructions. For example, the computer program instructions can be implemented as computer executable code programmed by one skilled in the art to perform an algorithm defined by the method steps described herein. Accordingly, by executing the computer program instructions, the processor 610 executes an algorithm defined by the methods of FIGS. 3-5 and other method steps described herein. Apparatus 600 also includes one or more network interfaces 680 for communicating with other devices via a network. Apparatus 600 may also include one or more input/output devices 690 that enable user interaction with apparatus 600 (e.g., display, keyboard, mouse, speakers, buttons, etc.).

Processor 610 may include both general and special purpose microprocessors and may be the sole processor or one of multiple processors of apparatus 600. Processor 610 may comprise one or more central processing units (CPUs), and one or more graphics processing units (GPUs), which, for example, may work separately from and/or multi-task with one or more CPUs to accelerate processing, e.g., for various image processing applications described herein. Processor 610, persistent storage device 620, and/or main memory device 630 may include, be supplemented by, or incorporated in, one or more application-specific integrated circuits (ASICs) and/or one or more field programmable gate arrays (FPGAs).

Persistent storage device 620 and main memory device 630 each comprise a tangible non-transitory computer readable storage medium. Persistent storage device 620, and main memory device 630, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 690 may include peripherals, such as a printer, scanner, display screen, etc. For example, input/output devices 690 may include a display device such as a cathode ray tube (CRT), plasma or liquid crystal display (LCD) monitor for displaying information to a user, a keyboard, and a pointing device such as a mouse or a trackball by which the user can provide input to apparatus 600.

Any or all of the functions of the systems and apparatuses discussed herein may be performed by processor 610, and/or incorporated in, an apparatus or a system such as LiDAR system 300. Further, LiDAR system 300 and/or apparatus 600 may utilize one or more neural networks or other deep-learning techniques performed by processor 610 or other systems or apparatuses discussed herein.

One skilled in the art will recognize that an implementation of an actual computer or computer system may have other structures and may contain other components as well, and that FIG. 6 is a high-level representation of some of the components of such a computer for illustrative purposes.

Figure 7:
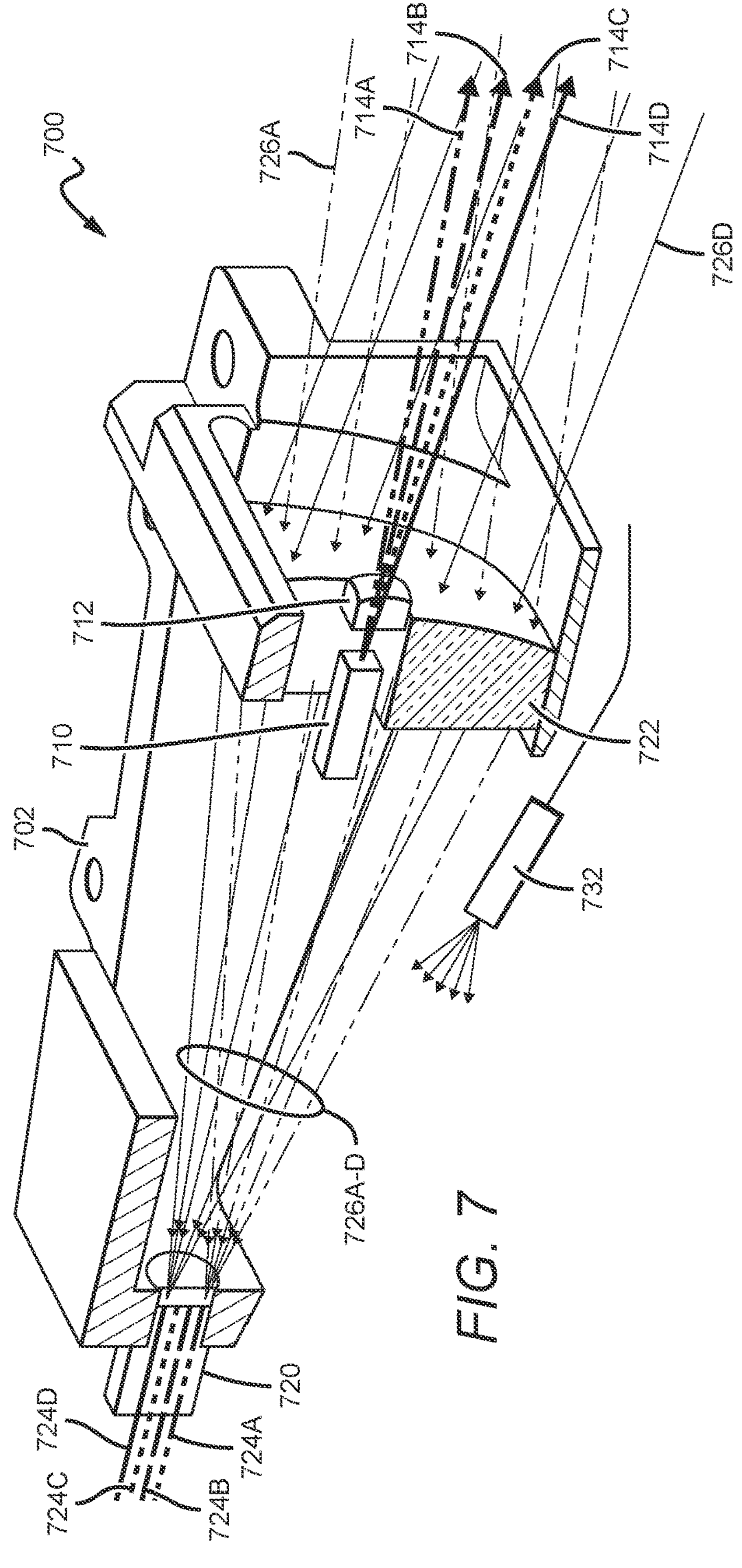
FIG. 7 is a perspective view of an optical fiber-based transceiver of a LiDAR system according to some embodiments.

FIG. 7 illustrates a perspective view of an example optical fiber-based transceiver 700 of a LiDAR system. In some embodiments, transceiver 700 comprises a transceiver housing 702, a transmitter channel assembly 710, a collimation lens 712, a collection lens 722, a receiver channel assembly 720, a plurality of detector assemblies (shown in FIG. 16), and a reference channel 732. Transceiver housing 702 can be made of metal, plastic, glass, composite materials, and/or any other desired materials. Transceiver housing 702 provides at least partial enclosures to transmitter channel assembly 710, receiver channel assembly 720, collection lens 722, and collimation lens 712. Transceiver housing 702 can be configured such that various components are positioned therein for proper operation. For example, as shown in FIG. 7, in one embodiment, transmitter channel assembly 710, collection lens 722, and collimation lens 712 are disposed towards the front end of transceiver housing 702 along its longitudinal direction. Receiver channel assembly 720 and at least a part of detector assemblies (shown in FIG. 16) are disposed towards the back end of transceiver housing 702. Furthermore, transceiver housing 702 is configured to have proper dimensions such that transceiver 700 can operate properly to achieve its optical functionalities. For example, the distance between collection lens 722 and receiver channel assembly 720 is configured to have a predetermined value such that each of return light 726A-D (FIG. 7 only shows return light 725A and 726D for illustration) can be directed properly from collection lens 722 to a respective receiver channel of receiver channel assembly 720. In FIG. 7, for instance, return light 726A is focused by collection lens 722 to a receiver channel 724A located at the bottom of the receiver channel assembly 720. And return light 726D is focused by collection lens 722 to a receiver channel 724D located at the top of the receiver channel assembly 720. It is understood that other return light 726B and 726C can be similarly focused by collection lens 722 to other respective receiver channels 724B and 724C respectively.

Figure 8A:
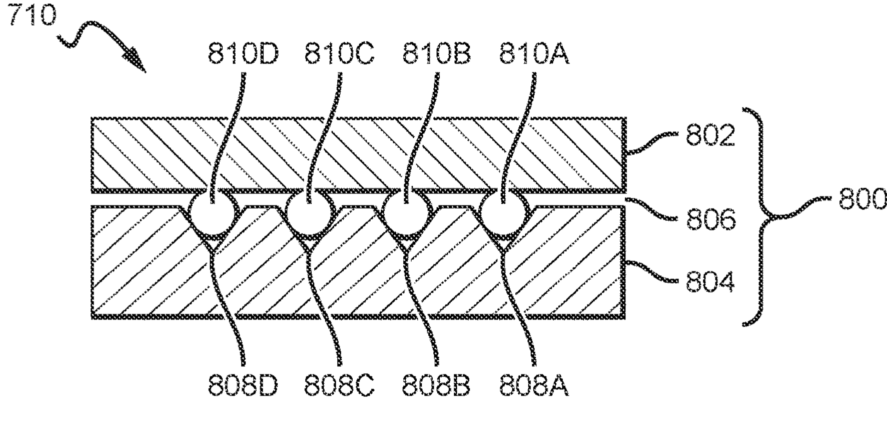
FIG. 8A is a cross-sectional view of optical fiber-based transmitter channels according to some embodiments.
Figure 8B:
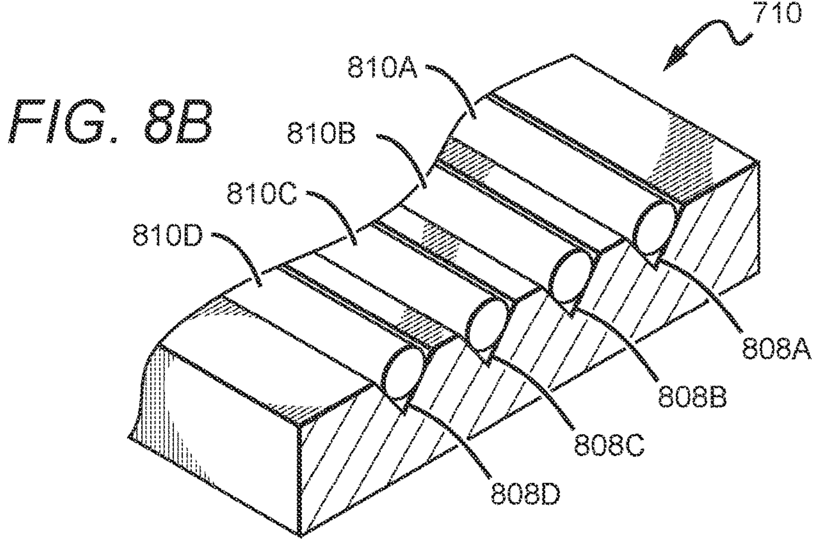
FIG. 8B is a perspective view of the optical fiber-based transmitter channels shown in FIG. 8A according to some embodiments.

With reference to FIG. 7, transceiver 700 comprises multiple transmitter channels configured to transmit a plurality of transmission light beams to a FOV. In some embodiments, there are four such transmitter channels in assembly 710 configured to transmit light beams 714A-D. In some embodiments, transmitter channels of assembly 710 are optical fiber-based transmitter channels. FIG. 8A is a cross-sectional view of one embodiment of optical fiber-based transmitter channel assembly 710. FIG. 8B is a perspective view of the optical fiber-based transmitter channel assembly 710. As shown in FIGS. 8A and 8B, in one embodiment, transmitter channel assembly 710 comprises four transmitter optical fibers 810A-D (collectively as 810), each of which is used for a transmitter channel. A transmitter channel is configured to communicate light signals from, for example, a light source to other optical components (e.g., a collimation lens) or to an FOV. In one embodiment, a transmitter channel comprises a transmitter optical fiber. While FIGS. 8A and 8B show four such transmitter optical fibers, it is understood that transmitter channel assembly 710 can comprise any number of optical fibers capable of being used for any number of transmitter channels. In some embodiments, transmitter channel assembly 710 is optically coupled to a light source and an optical beam splitter (not shown). The light source and the optical beam splitter may be integrated with transceiver 700 or may be separate components of the LiDAR system. In some embodiments, the light source is configured to generate a single light beam. The optical beam splitter receives the single light beam and forms multiple transmission light beams. The multiple transmission light beams are then directed to transmitter channel assembly 710. In some embodiments, the light source can generate multiple light beams directly, which are used for the multiple transmission light beams.

Referencing FIGS. 8A and 8B, in one embodiment, transmitter optical fibers 810 are disposed in a transmitter optical fiber housing 800 comprising a first housing portion 802 and a second housing portion 804. In some embodiments, second housing portion 804 comprises a plurality of grooves 808A-D (collectively as 808). Grooves 808 can be V-shaped grooves as shown in FIG. 8A or any other shaped grooves (e.g., round shaped, square shaped, U-shaped, or the like). In some embodiments, grooves 808 are configured to be parallel or substantially parallel (e.g., the center lines of two adjacent grooves are parallel or having an angle less than 0.1°) to one another. Each of transmitter optical fibers 810A-D is at least partially disposed in one of the grooves 808A-D, respectively. Therefore, transmitter optical fibers 810A-D are also parallel or substantially parallel to one another. In some embodiments, transmitter optical fibers 810A-D are not required to be parallel for their entire lengths. For example, the end portions of transmitter optical fibers 810A-D can be parallel or substantially parallel as illustrated in FIG. 8A, but other portions of the transmitter optical fibers 810A-D may not be parallel.

In some embodiments, the pitch between the adjacent grooves is preconfigured to provide a desired angular channel spacing between adjacent transmitter channels (and thus a desired angular separation between the transmission light beams). For example, the pitch between adjacent grooves may be configured to be about 100-400 μm. As described in more detail below, transmitter optical fibers 810A-D positioned with such a pitch have an angular channel spacing between about 0.5-2.5 degrees. As a result, the multiple transmission light beams are positioned 0.5-2.5 degrees apart from one another. The pitch between the adjacent grooves (and therefore between the adjacent transmitter optical fibers) can be precisely controlled to be the same or substantially the same (e.g., within a ±1 μm error) to provide the same or substantially the same angular channel spacing between the adjacent transmitter channels (and thus the angular separation between the transmission light beams). When the transmitter channels have proper angular channel spacings between them, the adjacent transmission light beams are positioned apart at a desired angular separation. The multiple transmission light beams can thus scan different areas within a FOV. The resulted scan pattern can have a desired high resolution. The transmitter described herein thus provides a good coverage of the scanned areas and improves the LiDAR system's scan resolution and speed.

Referencing still to FIGS. 8A-8B, in some embodiments, first housing portion 802 and second housing portion 804 are configured to secure transmitter optical fibers 810 in place. For example, by using first housing portion 802 and second housing portion 804, at least the part of transmitter optical fibers 810 that are disposed therebetween are fixed inside grooves 808. Therefore, the pitch between adjacent transmitter optical fibers 810 is also fixed. The angular channel spacing thus also does not change during operation. FIG. 8A illustrates that a gap 806 may exist between first housing portion 802 and second housing portion 804 in some embodiments. In one embodiment, gap 806 may be filled with an epoxy material, thereby further securing transmitter optical fibers 810 in place. In some embodiments, first housing portion 802 and second housing portion 804 are one integral piece, rather than two portions.

In some embodiments, one or more of the transmitter optical fibers 808A-D comprise one or more single-mode optical fiber(s). A single-mode optical fiber includes a core with a very small diameter (e.g., a few micrometers) that only allows one transverse mode of light at the designed wavelength to travel through. As a result, the output beam quality can be close to the diffraction limited (e.g., $M^2 \approx 1$).

Figure 9A:
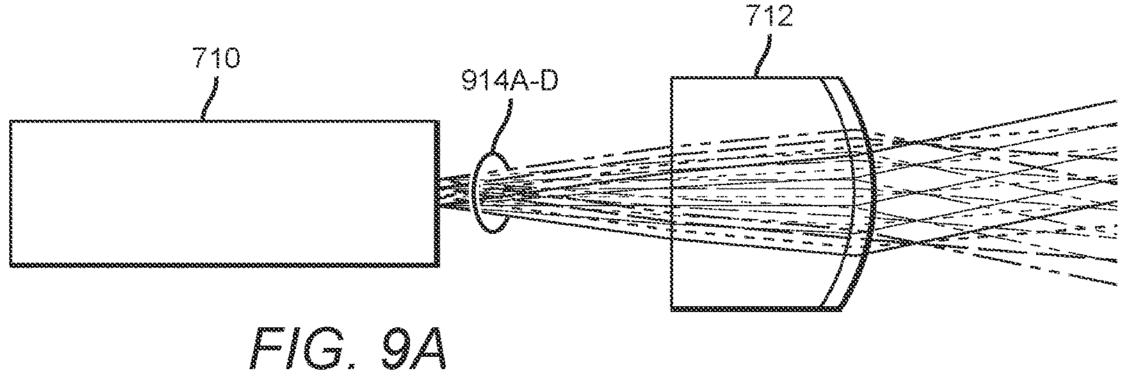
FIGS. 9A-9C illustrate optical fiber-based transmitter channels optically coupled to a collimation lens for directing transmission light beams according to some embodiments.
Figure 9B:
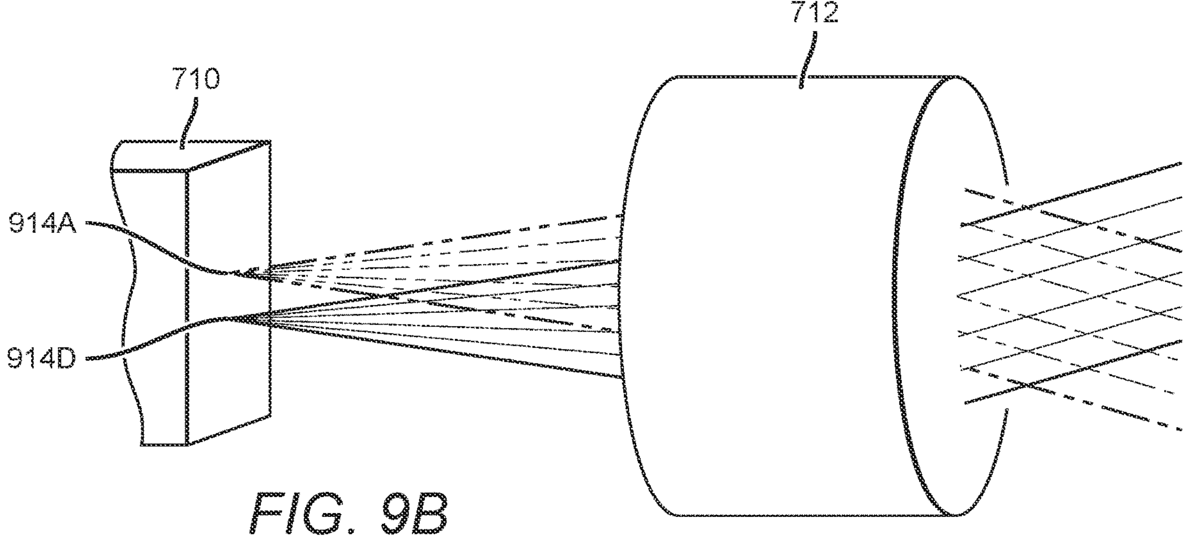
Figure 9C:
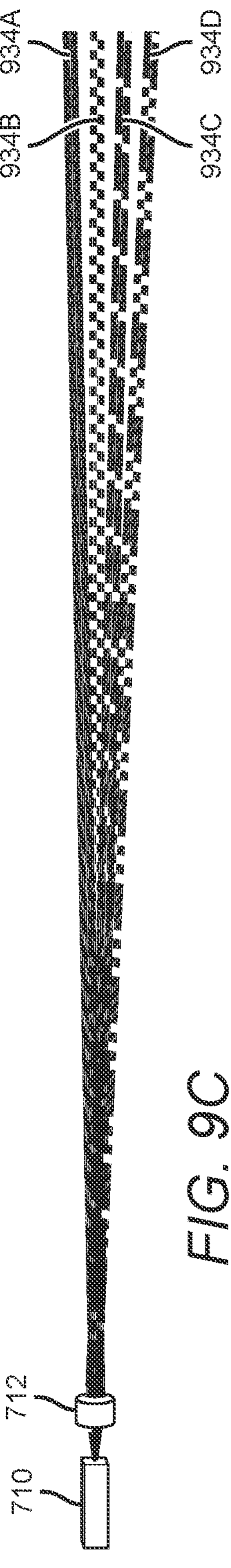

FIGS. 9A-9C illustrate using a single collimation lens 712 and transmitter channel assembly 710 having multiple optical fibers to form multiple transmission light beams with a desired angular separation. As described above, if each transmitter channel has its own collimation lens and/or other optical components, the dimensions of the transmitter may significantly increase, making it difficult to provide a compact LiDAR system. Further, the transmitter may include a greater number of optical components, making the transmitter less robust or reliable. FIGS. 9A-9C illustrate an embodiment where multiple transmitter channels provided by assembly 710 share a single collimation lens 712. Collimation lens 712 is positioned to be optically coupled to the assembly 710 to receive transmission light beams 914A-D (collectively as 914). Continuing with the above example, assembly 710 includes four transmitter optical fibers used for four transmitter channels. Each of the four transmitter optical fibers is disposed separately in a groove, which is positioned at a preconfigured pitch from its adjacent groove. As such, each of the four transmitter optical fibers of assembly 710 is also positioned at a preconfigured pitch from its adjacent transmitter optical fiber. The four transmitter optical fibers, or at least the end portions thereof, are parallel or substantially parallel to one another. In some embodiments, the end portions of the four transmitter optical fibers are polished to be flat. Each transmitter optical fiber in assembly 710 is used as at least a part of a transmitter channel that transmits a transmission light beam 914A, 914B, 914C, or 914D. In some embodiments, transmission light beams 914A-D are transmitted simultaneously to collimation lens 712. As transmission light beams 914A-D travel towards collimation lens 712 in free space, they expand in their spatial cross-sectional areas. As a result, the transmission light beams 914A-D begin to overlap with one another spatially, as shown in FIGS. 9A and 9B. Thus, when they reach collimation lens 712, transmission light beams 914A-D spatially overlap.

As shown in FIGS. 9B and 9C, collimation lens 712 receives transmission light beams 914A-D and collimates them to form collimated transmission light beams 934A-D (collectively as 934), respectively. Collimated transmission light beams 934A-D can correspond to transmission light beams 714A-D shown in FIG. 7. For clarity, FIG. 9B only illustrates transmission light beams 934A and 934D. The collimated beams have much smaller divergence compared to transmission light beams 914A-D, which allows them to reach further distance with concentrated energy. Collimation lens 712 can be, for example, a lens and/or mirror with a predetermined focal length. As described below in detail, the focal length of the collimation lens 712 and the pitch between the grooves 808 of assembly 710 collectively determine the angular channel spacing between the transmitter channels.

As shown in FIG. 9C, when collimated transmission light beams 934A-D travel farther away from collimation lens 712, the light beams become spatially separated as a result of their angular separation. The angular separation is caused by the position differences of the transmitter optical fibers 810A-D and the configuration of collimation lens 712. Specifically, the position differences of transmitter optical fibers 810A-D in transmitter channel assembly 710 causes transmission light beams 914A-D to be angularly separated. Collimation lens 712 is positioned to collimate the transmission light beams to four slightly different directions, causing them to have spatial separations from one another at certain distance away from collimation lens 712. The angular channel spacing is a parameter that measures or represents the degree of angular separation between the collimated transmission light beams 934, which are the light beams transmitted to scan an FOV. The angular channel spacing of the transmitter channels relates to the focal length of the collimation lens 712 and the pitch between adjacent transmitter optical fibers 810 (or equivalently the pitch between the grooves 808) through the follow equation [1].

Angular channel spacing pitch of the grooves for disposing the transmitter optical/fibers focal length of the collimation lens. [Eq. 1]

Therefore, to obtain a larger angular channel spacing, a larger pitch and/or a smaller focal length may be used, and vice versa.

By configuring the pitch between the transmitter optical fibers and/or the focal length of the collimation lens, the desired angular channel spacing can be obtained. In some embodiments, the angular channel spacing is determined based on one or more of a required LiDAR scan resolution, a region-of-interest (ROI) requirement, and a scan range of the field-of-view. For example, a smaller angular channel spacing (and/or a larger number of transmitter channels) may be required for a higher scanning resolution. An ROI area may need to be scanned with a higher resolution while a non-ROI area may use a lower resolution scan. Therefore, the scanning performance of the LiDAR system can be improved by using multiple transmitter channels having a properly configured angular channel spacing.

As described above, embodiments disclosed herein use multiple transmitter channels comprising an array of transmitter optical fibers. At least the end portions of the transmitter optical fibers are configured to have a precision pitch. A single collimation lens is used to form collimated transmission light beams for all transmitter channels. As a result, many transmitter channels can be assembled or integrated into the space corresponding to a single collimation lens, thereby reducing the dimensions of the transceiver and making the LiDAR system more compact. Moreover, the complexity of the alignment of the entire transmitter channel assembly 710 is also reduced because multiple transmitter channels share a single collimation lens.

As described above, a collimation lens can be used to collimate multiple transmission light beams to form collimated transmission light beams. In some embodiments, the collimation lens and the collection lens may be disposed side-by-side. In other embodiments, it is beneficial to have the collimated transmission light beams shifted to a location around the center of the collection lens. The transceiver thus may further comprise an optical beam-shifting system that redirects the collimated transmission light beams such that at least a part of the collimated transmission light beams is positioned within an optical receiving aperture of the collection lens. In some embodiments, an optical beam-shifting system includes one or more of prisms, lenses, and mirrors configured to redirect the collimated transmission light beams such that the redirected collimated transmission light beams are substantially parallel to the collimated transmission light beams.

Figure 10:
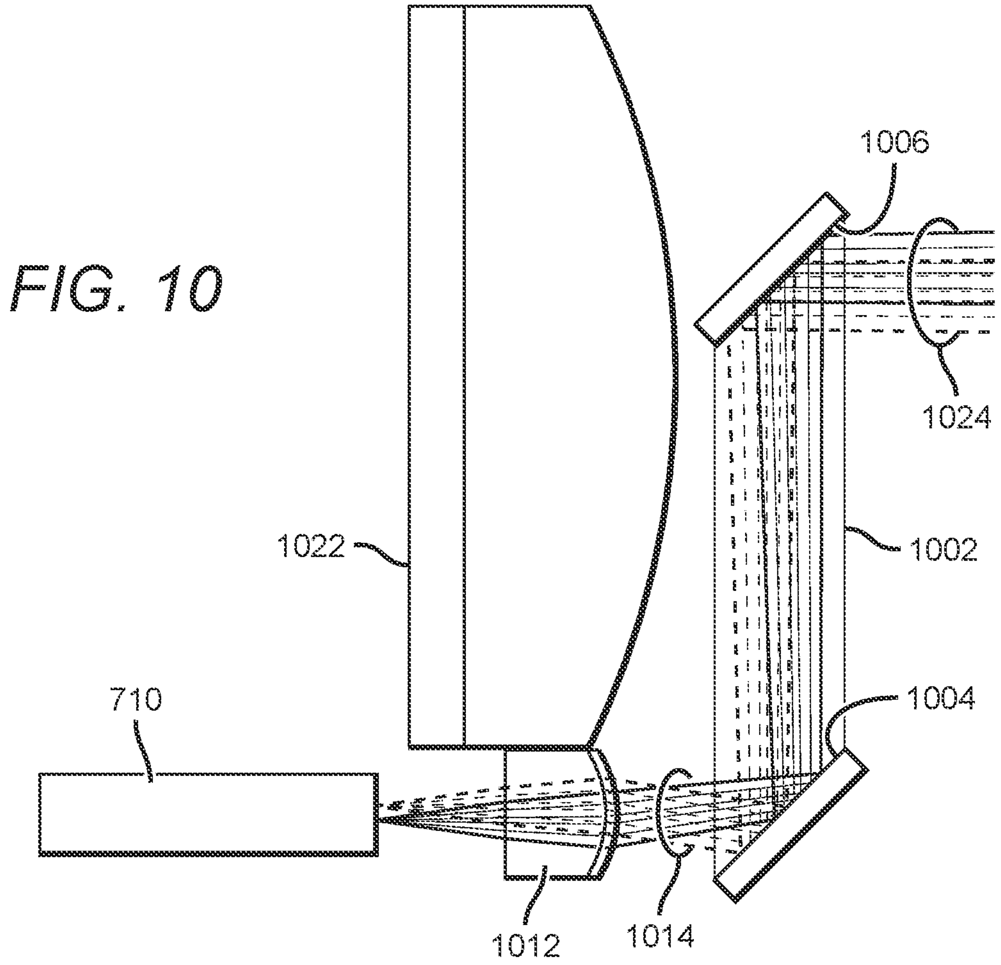
FIG. 10 illustrates optical fiber-based transmitter channels optically coupled to an optical beam-shifting system for redirecting transmission light beams according to some embodiments.

FIG. 10 illustrates one example of such a beam-shifting system using a periscope prism 1002. In FIG. 10, transmitter channel assembly 710 is optically coupled to a collimation lens 1012, which is optically coupled to periscope prism 1002 for directing collimated transmission light beams 1014. Collimation lens 1012 can be used to implement collimation lens 712 in FIG. 7. Collection lens 1022 can be used to implement collection lens 722 in FIG. 7. In one embodiment, collection lens 1022 may have a flat top and/or bottom surfaces, which makes it easier for assembling collection lens 1022 into the transceiver housing. In the embodiment shown in FIG. 10, collimation lens 1012 is disposed on the bottom of collection lens 1022. Periscope prism 1002 can shift the collimated transmission light beams 1014 to be positioned within the optical receiving aperture of the collection lens 1022. Periscope prism 1002 includes, for example, a system of prisms, lenses, and/or mirrors to redirect light beams through a tube. In one example, periscope prism 1002 includes two parallelly-disposed reflecting surfaces 1004 and 1006 that redirect the light beams along the vertical tube. The reflecting surface 1004 (similarly reflecting surface 1006) may be a part of a mirror and/or a prism. Using reflective surface 1004 of periscope prism 1002, collimated transmission light beams 1014 are redirected at an angle of about 90 degrees down the periscope tube. The redirected light beams are redirected again by reflective surface 1006 to make another about 90-degree turn and then transmitted out to the FOV as redirected transmission light beams 1024. Periscope prism 1002 is configured to have proper dimensions such that redirected transmission light beams 1024 are positioned around the center of collection lens 1022, which allows the return light generated based on redirected transmission light beams 1024 to be properly collected by collection lens 1022.

Figures 11A, 11B:
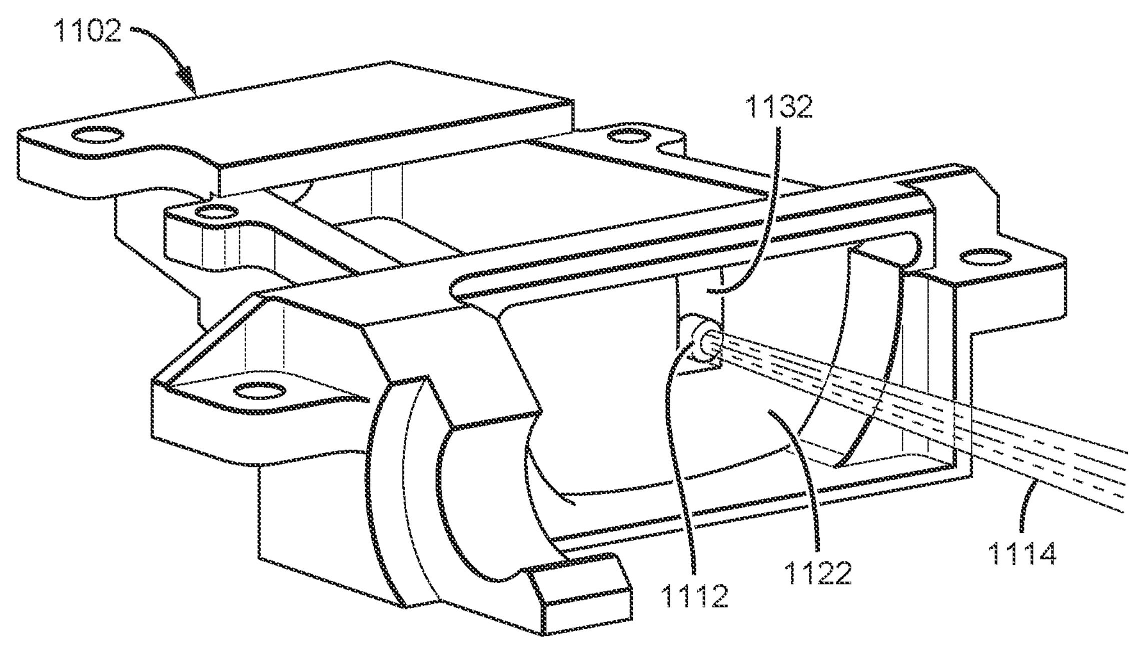
FIG. 11A is a perspective view of a fiber-based transceiver according to some embodiments.
FIG. 11B is a side view of a collection lens and collimation lens assembly according to some embodiments.

FIGS. 11A and 11B illustrate another configuration of a collimation lens 1112 and a collection lens 1122. As shown in FIGS. 11A and 11B, using this configuration, collimated transmission light beams 1114 are positioned within the optical receiving aperture of collection lens 1122. FIG. 11A is a perspective view of a transceiver comprising collimation lens 1112 and collection lens 1122. FIG. 11B is a side view of collimation lens 1112 and collection lens 1122. Collimation lens 1112 and collection lens 1122 can be used to implement collimation lens 712 and collection lens 722 in FIG. 7, respectively. In FIGS. 11A and 11B, collection lens 1122 may have a same or different shape compared to collection lens 1022 shown in FIG. 10. The shape of collection lens 1122 can be designed in any desired manner such that it is easy to be assembled into transceiver housing 1102 while maintaining a sufficient optical receiving aperture to receive return light.

FIGS. 11A and 11B further illustrate that collection lens 1122 comprises an opening 1132. Opening 1132 may be a rectangular-shaped opening, a circular-shaped opening, a square shaped opening, or any other shaped opening. In some embodiments, opening 1132 is made from the curved front side surface 1126 to back side surface 1128 of collection lens 1122. Opening 1132 is positioned in the horizontal center part of collection lens 1122. In some embodiments, transmitter channel assembly 710 and collimation lens 1112 are at least partially disposed in opening 1132 of collection lens 1122. As described above, transmission light beams are delivered using the multiple transmitter optical fibers of assembly 710 and received by collimation lens 1112. Collimation lens 1112 collimates the transmission light beams to generate collimated transmission light beams 1114. Because of opening 1132, collimated transmission light beams 1114 can be transmitted through collection lens 1122 to scan the FOV. The position of the collimation lens 1112 can be configured such that collimated transmission light beams 1114 are positioned at a select location within an optical receiving aperture of the collection lens 1122 to optimize collection of return light. In one embodiment, opening 1132 is located at or around the center of the collection lens 1122's optical receiving aperture.

Figure 12:
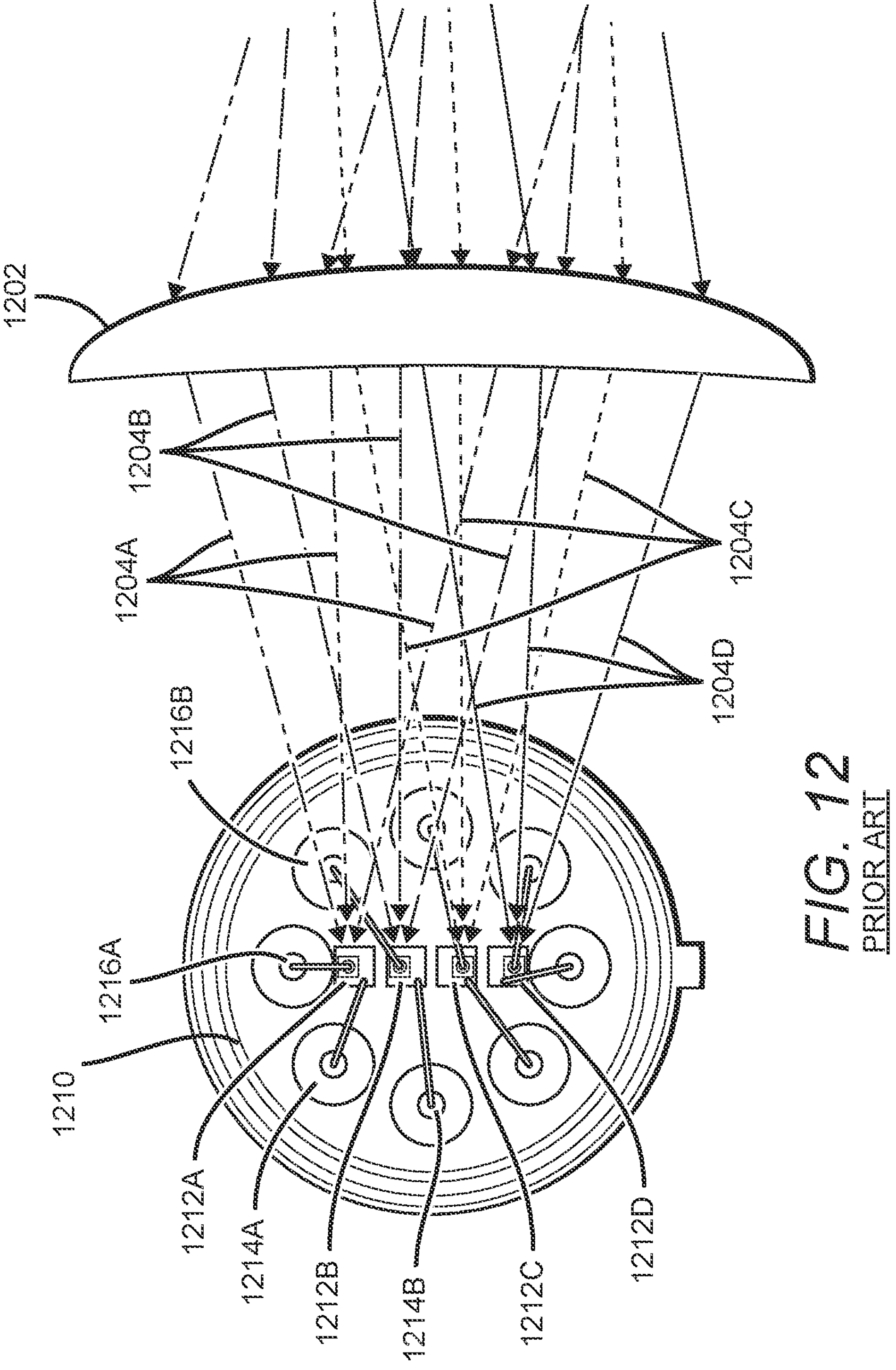
FIG. 12 is a conventional detector assembly for detecting return light directed by a collection lens.

As described above, when multiple transmission light beams are scanned into an FOV, some of the light may be reflected and/or scattered by objects in the FOV. The reflected or scattered light forms return light that is received and detected by the LiDAR system. FIG. 12 illustrates a conventional detector assembly 1210 for detecting return light directed by a collection lens 1202 of an optical receiver. When multiple transmission light beams are used to scan an FOV, return light corresponding to different transmission light beams are collected by one or more collection lens. In the example shown in FIG. 12, return light 1204A-D correspond to four different transmission light beams that are transmitted to the FOV and scattered by one or more objects in the FOV. Collection lens 1202 receives the return light 1204A-D corresponding to the four different transmission light beams and focuses each of them to a different avalanche photodetector (APD) disposed in detector assembly 1210. As shown in FIG. 12, detector assembly 1210 has four APDs 1212A-D for receiving different return light 1204A-D, respectively. APDs 1212A-D must be closely positioned in an array such that they can properly receive the respective return light 1204A-D directed from collection lens 1202. In other words, APDs 1212A-D must be disposed at fixed locations of detector assembly 1210. This inflexible arrangement of the APD array means that adjacent APDs must be disposed very close to each other. Disposing adjacent APDs close to each other causes optical crosstalk between the APDs. For example, return light 1204A and 1204B should only be received by APD 1212A and APD 1212B, respectively. But because APD 1212A is placed so close to APD 1212B, some return light 1204A may be scattered and received by APD 1212B, and vice versa. Moreover, the inflexible arrangement of the APDs also means that the individual APDs need to be precisely positioned in order to receive the different return light. But placement of the individual APDs frequently has errors. The placement errors of APDs also contribute to the optical crosstalk.

The optical crosstalk and APDs' placement errors may result in wrong signal intensities and/or wavelengths (e.g., if return light 1204A and 1204B have different wavelengths) being detected. In turn, the wrong signal intensities may result in reducing of the accuracy of determining various object parameters (e.g., distance, shape, speed, or the like). The overall LiDAR performance may thus be negatively impacted.

Furthermore, as illustrated in FIG. 12, each of APDs 1212A-D has associated electrical channels comprising wires, cables, signal processing circuitries, or the like. For example, APD 1212A is electrically coupled to electrical channels 1214A and 1216A; APD 1212B is electrically coupled to electrical channels 1214B and 1216B; and so forth. These electrical channels are also disposed close to one another in detector assembly 1210. As a result, electrical crosstalk may occur between different electrical channels associated with different APDs. The electrical crosstalk further reduces the signal-to-noise ratio and in turn reduces detection accuracy, and thus further impacting the overall LiDAR performance.

Figure 13:
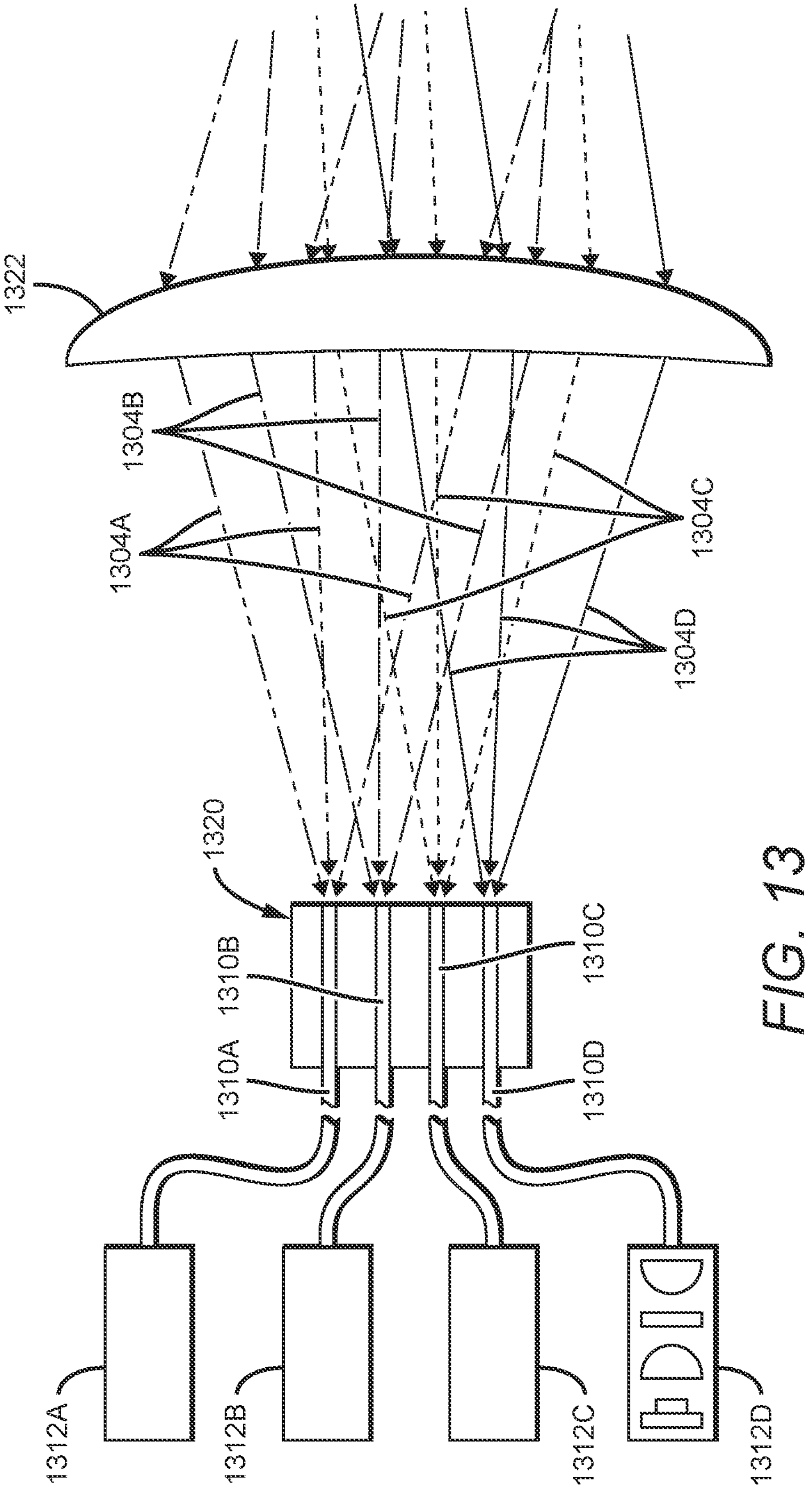
FIG. 13 illustrates fiber-based receiver channels for detecting return light directed by a collection lens according to some embodiments.

FIG. 13 illustrates a fiber-based receiver channel assembly 1320 for detecting return light directed by a collection lens 1322. Receiver channel assembly 1320 can be used to implement receiver channel assembly 720 shown in FIG. 7. Collection lens 1322 is disposed to receive and redirect return light 1304A-D to receiver channel assembly 1320. Receiver channel assembly 1320 comprises a plurality of receiver optical fibers, each of which corresponds to a receiver channel. A receiver channel is configured to communicate light signals from, for example, a FOV to detectors directly or indirectly via other optical components (e.g., a collection lens, optical fibers, or the like). Receiver optical fibers 1310A-D of assembly 1320 are optically aligned based on the transmission angles of the corresponding transmission light beams. As described above, each transmission light beam is angularly separated from its adjacent transmission light beam corresponding to a desired or predetermined angular channel spacing. Therefore, for a particular transmission light beam, its corresponding return light also has an angular separation from the return light corresponding to other transmission light beams. As such, different return light 1304A-D generated from different transmission light beams (e.g., beams 714A-D shown in FIG. 7) can be directed to their respective receiver channels by collection lens 1322.

As shown in FIG. 13, because of return light 1304A-D are angularly separated, return light 1304A is directed to receiver optical fiber 1310A by collection lens 1322; return light 1304B is directed to receiver optical fiber 1310B by collection lens 1322; and so forth. While FIG. 13 illustrates four receiver optical fibers 1310A-D in receiver channel assembly 1320, it is understood that receiver channel assembly 1320 can include any number of receiver optical fibers corresponding to any number of receiver channels (e.g., 2, 4, 6, 8, or the like). In one embodiment, the multiple receiver optical fibers in receiver channel assembly 1320 can share a single collection lens, thereby reducing the dimensions of the transceiver of a LiDAR system. In turn, this makes the LiDAR system more compact. In some other embodiment, if more space is available to the LiDAR system, multiple collection lens may be used for multiple receiver optical fibers.

Referencing still to FIG. 13, in some embodiments, receiver channel assembly 1320 includes receiver optical fibers 1310A-D that are optically coupled to respective detector assemblies 1312A-D. In some embodiments, each of receiver optical fibers 1310A-D corresponds to a different receiver channel that communicates different return light signals. Each of the receiver channels directs corresponding return light to a detector assembly (e.g., assemblies 1312A-D) using receiver optical fibers 1310A-D and/or other optical components. For example, receiver optical fiber 1310A receives return light 1304A directed by collection lens 1322 and communicates it to detector assembly 1312A; receiver optical fiber 1310B receives return light 1304B directed by collection lens 1322 and communicates it to detector assembly 1312B; and so forth. Because optical fibers are physically flexible (e.g., an optical fiber may be bended to any shape or may not have a physically linear shape along its entire longitudinal direction), detector assemblies 1312A-D can be flexibly distributed. Detector assemblies 1312A-D can be positioned at any desired locations while still being coupled to their respective receiver optical fibers 1310A-D.

Thus, adjacent detector assemblies can be placed at different locations further away from each other. As a result, both the optical crosstalk and electrical crosstalk between adjacent detector assemblies are significantly reduced. Moreover, an optical fiber has a core layer surrounded by cladding materials, thereby providing spatial filtering to further reduce the optical crosstalk. As described in more detail below, adjacent receiver optical fibers can be positioned at a precise pitch from each other. This further reduces alignment error such that return light generated from different transmission light beams are accurately aligned with the corresponding receiver optical fiber. The return light can thus be received properly at the corresponding receiver optical fiber with reduced or minimum loss or crosstalk. The detector assemblies 1312A-D (collectively 1312) are described in more detail below.

Figure 14:
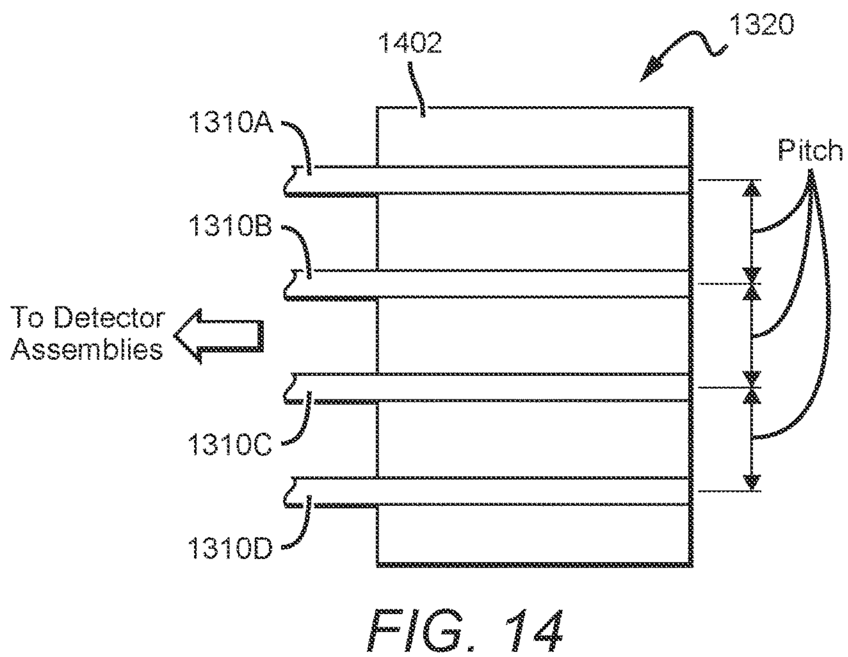
FIG. 14 illustrates fiber-based receiver channels according to some embodiments.

FIG. 14 illustrates fiber-based receiver channel assembly 1320 in more detail according to some embodiments. Receiver channel assembly 1320 comprises a plurality of receiver optical fibers 1310A-D (collectively 1310). In one embodiment, each of receiver optical fibers 1310A-D corresponds to an optical receiving channel. Referencing FIG. 14, in one embodiment, receiver optical fibers 1310 are disposed in a receiver optical fiber housing 1402. Receiver optical fiber housing 1402 comprises a plurality of grooves. The grooves can be V-shaped grooves similar to those shown in FIG. 8A or any other shaped grooves (e.g., round shaped, square shaped, U-shaped, or the like). In some embodiments, the grooves in receiver optical fiber housing 1402 are configured to be parallel or substantially parallel (e.g., the center lines of two adjacent grooves forming an angle less than 0.10) to one another. Each of receiver optical fibers 1310A-D is at least partially disposed in one of the grooves. Therefore, receiver optical fibers 1310A-D are also parallel or substantially parallel to one another. In some embodiments, receiver optical fiber housing 1402 comprises openings and receiver optical fibers 1310A-D can be inserted into these openings. These openings can be precisely formed and aligned to accommodate receiver optical fibers 1310A-D.

In some embodiments, adjacent grooves are positioned at a predetermined pitch from each other. In one embodiment, the pitch between adjacent grooves is measured from the center lines of the adjacent grooves. The pitch between the adjacent grooves is preconfigured to a proper value such that receiver optical fibers 1310A-D are positioned to receive respective return light directed by the collection lens. As described above, the return light generated from different transmission light beams are directed by the collection lens at different angles. Therefore, the value of the pitch between adjacent grooves can also be determined based on the angular channel spacing of the transmitter channels. For example, the pitch between adjacent grooves may be configured to be about 200-2000 μm. Receiver optical fibers 1310A-D disposed with such a pitch can be used to receive return light generated from transmitter channels having an angular channel spacing of about 0.5-2.5 degrees. The pitch between the adjacent grooves, and the pitch between the adjacent receiver optical fibers, can be precisely controlled to be the same or substantially the same (e.g., within a ±10 μm error) such that the return light generated from different transmission light beams are received and directed properly to their respective receiver optical fibers. Referencing still to FIG. 14, in some embodiments, receiver optical fiber housing 1402 secures receiver optical fibers 1310 in place. For example, the grooves or openings of receiver optical fiber housing 1402 are configured to have proper dimensions to facilitates fixing receiver optical fibers 1310 in place. Other techniques and/or materials can also be used to fix receiver optical fibers 1310 in place (e.g., using epoxy materials).

In some embodiments, each of the receiver optical fibers 1310A-D comprises a multi-mode optical fiber. Compared to a single-mode optical fiber, a multi-mode optical fiber has a much larger core diameter (e.g., 50-1000 micrometers), which is much larger than the wavelength of the light carried in the multi-mode optical fiber. Because of the large core and thus the possibility of a large numerical aperture, a multi-mode optical fiber has greater light-gathering capacity than single-mode optical fiber. Thus, multi-mode optical fibers are more appropriate for receiving return light directed by the collection lens. Multi-mode optical fibers thus generally perform better than single-mode optical fibers when they are used in receiver channels.

Figure 15:
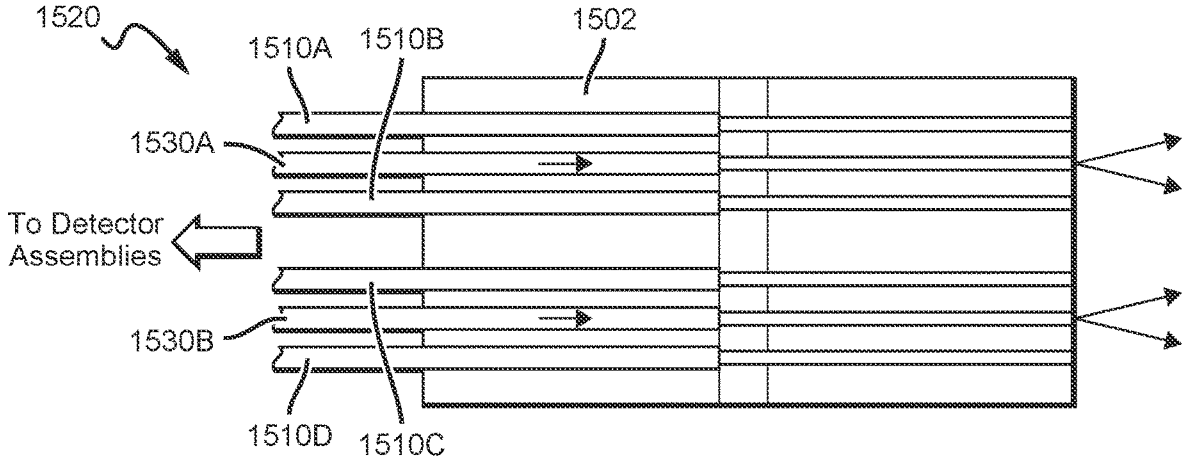
FIG. 15 illustrates fiber-based receiver channels according to some embodiments.

FIG. 15 illustrates another embodiment of a fiber-based receiver channel assembly 1520. Receiver channel assembly 1520 can be used to implement receiver channel assembly 720 shown in FIG. 7. Similar to receiver channel assembly 1320 described above, receiver channel 1520 comprises a receiver optical fiber housing 1502 and multiple (e.g., four) receiver optical fibers 1510A-D. Each of the receiver optical fibers 1510A-D may be used for a receiver channel for communicating return light to the detector directly or indirectly via other optical components (e.g., a collection lens). Optical fiber housing 1502 and receiver optical fibers 1510A-D are similar to optical fiber housing 1402 and receiver optical fibers 1310A-D. Thus, they are not repeatedly described.

In the embodiment shown in FIG. 15, receiver channel assembly 1520 further comprises two alignment optical fibers 1530A and 1530B. Each of alignment optical fibers 1530A and 1530B is at least partially disposed in a groove in receiver fiber array housing 1502. In some embodiments, one or both of alignment optical fibers 1530A and 1530B are disposed between two receiver optical fibers. For example, alignment optical fiber 1530A is disposed between receiver optical fiber 1510A and receiver optical fiber 1510B. Similarly, alignment optical fiber 1530B is disposed between receiver optical fiber 1510C and receiver optical fiber 1510D. It is understood that alignment optical fibers can be disposed at other locations relative to the receiver optical fibers. For example, they can be disposed on the outer sides of the receiver optical fibers.

Alignment optical fibers 1530A and 1530B do not carry return light to detector assemblies. Alignment optical fibers 1530A and 1530B facilitate alignment of the plurality of receiver optical fibers 1510A-D. Using alignment optical fiber 1530A as an example, light can be couple to alignment optical fiber 1530A from the end opposite to the end where receiver optical fibers 1510A-B receive return light (i.e., from the end that is close to the detector assemblies coupled to receiver optical fibers 1510A-B). The light travels through alignment optical fiber 1530A and can be measured by a beam profiler as if the light is a transmission light beam. For example, the light received at the other end of the alignment optical fiber can be measured for the beam width, beam pointing, and beam rotation alignment. Once the alignment optical fiber 1530A is aligned, receiver optical fibers 1510A and 1510B are considered aligned too, because the receiver optical fibers and the alignment optical fiber are disposed at a precise pitch from one another.

In some embodiments, during operation, one or both alignment optical fibers 1530A and 1530B can be used to generate uniform illumination for other channels as reference signals. For example, alignment optical fiber 1530A may be used to provide a reference signal for measuring distances of one or more objects within the FOV. Alignment optical fibers 1530A and/or 1530B can be used to implement reference fiber 732 shown in FIG. 7. As described above, the LiDAR system can measure the distance of an object based on the time-of-flight method. The reference signal can be used as a time stamp to set a starting point for the time-of-flight measurement. Using this time stamp and the time that the corresponding return light is received, the time-of-flight can be computed and in turn the distance can be computed.

Figure 16:
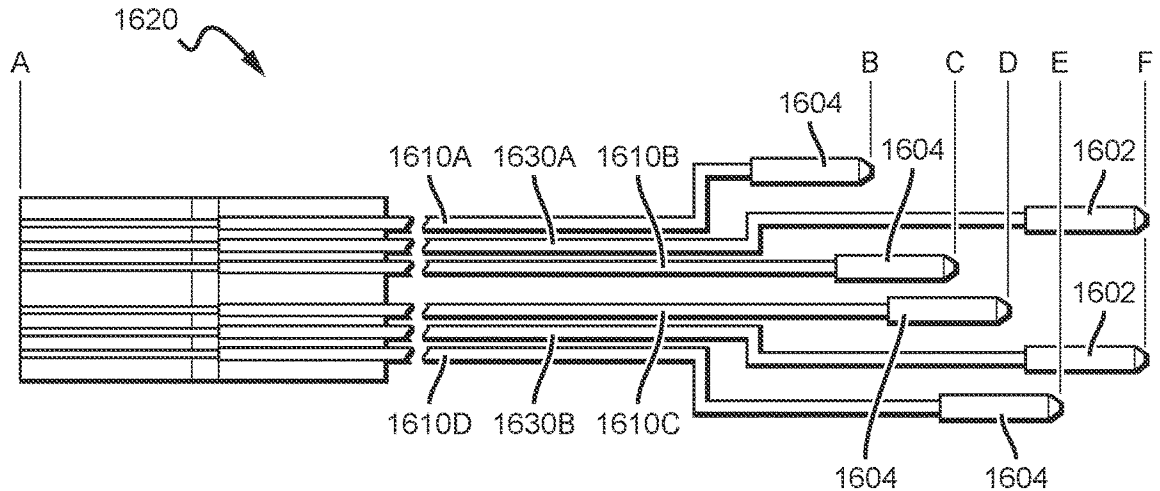
FIG. 16 illustrates fiber-based receiver channels having fiber ferrules according to some embodiments.

FIG. 16 illustrates an embodiment of receiver channel assembly 1620. Receiver channel assembly 1620 can be used to implement receiver channel assembly 720 in FIG. 7. Receiver channel assembly 1620 comprises an array of six fibers 1610A-D and 1630A-B. Fibers 1610A-D are receiver optical fibers and fibers 1630A-B are alignment optical fibers. They are the same or similar to receiver optical fibers 1510A-D and alignment optical fibers 1530A-B described above, respectively, and thus are not repeatedly described. In some embodiments, one or more of receiver optical fibers 1510A-D and alignment optical fibers 1530A-B are coupled with fiber ferrules. As illustrated in FIG. 16, for example, receiver optical fibers 1510A-D are coupled with receiver fiber ferrules 1604 and alignment optical fibers 1530A-B are coupled with alignment fiber ferrules 1602. In some embodiments, fiber optic ferrules are mechanical fixtures, generally rigid tubes, which are used to confine the stripped end of a fiber or a fiber bundle. They align and polish optical fibers to prevent the scattering and dampening of the light signal. Fiber optic ferrules are made of, for example, borosilicate glass. In one embodiment, fiber ferrules are not permanently coupled to the optical fibers and are removable. As described below, fiber ferrules can facilitate the alignment of the receiver optical fibers with detector assemblies (e.g., reducing the complexity and cumbersomeness of the alignment). After the alignment, the fiber ferrules can be removed.

In some embodiments, as shown in FIG. 16, receiver optical fibers 1610A-D can have different fiber lengths. For example, receiver optical fibers 1610A-D may have nominal lengths of about 195 mm, 215 mm, 235 mm, and 255 mm, respectively. The tolerance may be 15 mm. Different lengths of the receiver optical fibers enable the detector assemblies coupled to the different receiver optical fibers to be placed at different locations, thereby reducing optical crosstalk and/or electrical crosstalk. For example, if the LiDAR system is required to be a compact system that can be fit into a small space in a vehicle, the detector assemblies may need to be placed close to one another. Because of the different lengths of the receiver optical fibers, the detector assemblies can be coupled to the receiver optical fibers in a staggered manner such that the detector assemblies are not placed side-by-side. Furthermore, the different lengths of the receiver optical fibers also enable the detector assemblies to be placed anywhere in a vehicle. For example, the detector assembly coupled to receiver optical fiber 1610A may be placed near the transmitter channels in a transceiver while the receiver optical fiber 1610D may be placed far away from the transmitter channels. It is understood that the receiver optical fibers can have any desired lengths not limited to those shown in FIG. 16.

Figure 17:
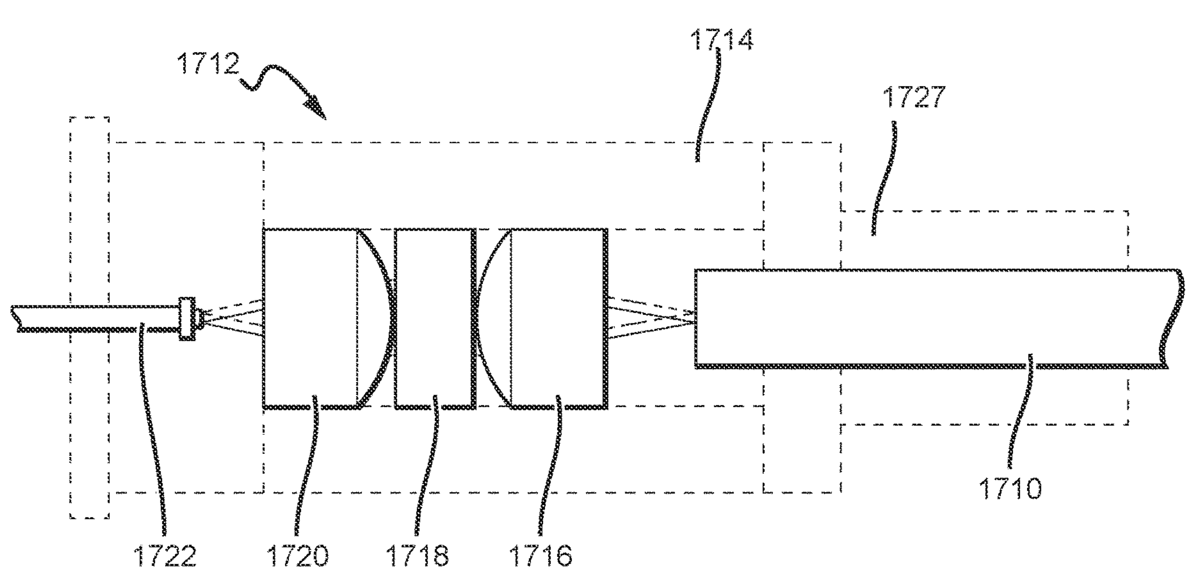
FIG. 17 illustrates a detector assembly that is coupled to a fiber-based receiver channel according to some embodiments.

FIG. 17 illustrates an exemplary detector assembly 1712 that is capable of being coupled to a fiber-based receiver optical fiber 1710. Detector assembly 1712 can be used to implement one or more detector assemblies 1312A-D shown in FIG. 13. In some embodiments, detector assembly 1712 comprises a detector assembly housing 1714. Detector assembly housing 1714 provides at least a partial enclosure and protection for various components of detector assembly 1712. Detector assembly housing 1714 has an opening at one end, through which a fiber coupling port 1727 is disposed. Fiber coupling port 1727 in detector assembly 1712 may include an alignment ferrule (not shown) configured to couple to a fiber ferrule mounted on a receiver optical fiber 1710. In one embodiment, the fiber ferrule mounted on receiver optical fiber 1710 can be inserted into fiber coupling port 1727 and aligned with the alignment ferrule of detector assembly 1712. As a result, receiver optical fiber 1710 is optically coupled to detector assembly 1712 such that the return light carried by receiver optical fiber 1710 is delivered to collimation lens 1716. In some embodiments, by using the fiber ferrule mounted on the receiver optical fiber 1710, fiber coupling port 1727, and the alignment ferrule of detector assembly 1712, the optical coupling of receiver optical fiber 1710 to detector assembly 1712 can be precisely controlled. Moreover, such a coupling may or may not be permanent and can be removeable. As such, the detector assembly and the receiver optical fiber can be easily separated for maintenance or replacement. It is understood that receiver optical fiber 1710 may also be inserted into the opening of detector assembly 1712 and aligned with the optical components therein without using ferrules.

In some embodiments, detector assembly 1712 comprises a collimation lens 1716 optical coupled to a receiver optical fiber 1710. Collimation lens 1716 collimates the return light carried by receiver optical fiber 1710. Detector assembly further comprises a bandpass filter 1718 optically coupled to collimation lens 1716. Bandpass filter 1718 operates to filter out light having undesired wavelengths (e.g., sunlight or any other undesired light interference), thereby reducing optical noise and background light. In some embodiments, bandpass filter 1718 can be configured to have a narrow pass band. Bandpass filter 1718 can also have a small dimension and be cost-effective compared to larger bandpass filters. Bandpass filter 1718 is further optically coupled to a focusing lens 1720, which focuses the filtered return light to detector 1722. In some embodiments, detector 1722 can be an avalanche photodiode detector (APD) or any other desired type of detector. As shown in FIG. 17, detector assembly 1712 combined several components (e.g., the focusing lens 1720, bandpass filter 1718, collimation lens 1716, alignment ferrule 1724, and detector 1722) together in one assembly module. This configuration allows multiple receiver channels to be aligned separately with their respective detector assemblies. Further, the detachable detector assembly configuration allows detectors to be mounted and tested directly on the detector board, thereby simplifying the assembly and testing complexity. Moreover, the detector assembly configuration allows easy replacement if the detector assembly is not operating properly, making the maintenance of the LiDAR system more efficient.

While FIG. 17 only illustrates one detector assembly, it is understood that a LiDAR system can comprise multiple such detector assemblies (e.g., four or more) for used in multiple receiver channels. Each detector assembly can be positioned at a distance sufficiently away from other detector assemblies to reduce or minimize at least one of electrical crosstalk and scattered light receivable at the detector assembly. Moreover, while the above embodiments use optical fiber segments as illustration, it is understood that the transmitter channels and/or receiver channels can use optical waveguide segments for reducing optical crosstalk in alternative embodiments. For example, such optical waveguides may include transparent dielectric waveguides made of plastic and/or glass, strip waveguides, rib waveguides, photonic crystal waveguides, and/or laser-inscribed waveguides. An optical waveguide operates as a spatial filter. In some embodiments, an optical waveguide can be combined with the above-described techniques to further reduce optical crosstalk. In other embodiments, one or more baffles can be used in a LiDAR system to reduce scattered light. A baffle can be a mechanical structure (e.g., a hood) that is used to shield stray light coming from sources outside of the FOV. A baffle can be used in combination with, or to replace, the above-described techniques to further reduce optical crosstalk. In other embodiments, receiver channels may comprise one or more optical planar lightwave circuits (PLC). PLC, also referred to as slab waveguides, are waveguides with a planar geometry, which guide light only in one dimension. PLC can be used in combination with, or to replace, the above-described techniques to further reduce at least one of electrical crosstalk and optical crosstalk.

Various exemplary embodiments are described herein. Reference is made to these examples in a non-limiting sense. They are provided to illustrate more broadly applicable aspects of the disclosed technology. Various changes may be made, and equivalents may be substituted without departing from the true spirit and scope of the various embodiments. In addition, many modifications may be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which may be readily separated from or combined with the features of any of the other several embodiments without departing from the scope or spirit of the various embodiments.

What is claimed is:

1. A light detection and ranging (LiDAR) scanning system, comprising:

- a plurality of transmitter channels configured to transmit a plurality of transmission light beams to a field-of-view at a plurality of different transmission angles;
- a collection lens disposed to receive and redirect return light obtained based on the plurality of transmission light beams illuminating one or more objects within the field-of-view;
- a collimation lens disposed on a side of the collection lens to receive and redirect the plurality of transmission light beams to an optical beam-shifting system, wherein the optical beam-shifting system is configured to redirect the plurality of collimated transmission light beams such that at least one of redirected collimated transmission light beams is positioned within an optical receiving aperture of the collection lens;
- a plurality of receiver channels optically coupled to the collection lens, wherein each of the receiver channels is optically aligned based on a transmission angle of a corresponding transmission light beam; and
- a plurality of detector assemblies optically coupled to the plurality of receiver channels, wherein each of the receiver channels directs redirected return light to a detector assembly of the plurality of detector assemblies.

2. The system of claim 1, wherein the plurality of transmitter channels comprises a plurality of transmitter optical fibers.

3. The system of claim 1, wherein the plurality of receiver channels comprises a plurality of receiver optical fibers.

4. The system of claim 3, wherein each of the receiver optical fibers is at least partially disposed in a groove of a plurality of grooves in a receiver optical fiber housing, and wherein the plurality of grooves are disposed at a predetermined pitch from their adjacent grooves.

5. The system of claim 3, wherein one end of at least one of the plurality of receiver optical fibers is coupled to a removable ferrule.

6. The system of claim 3, wherein at least two of the receiver optical fibers have different lengths.

7. The system of claim 3, wherein the receiver optical fibers comprise multi-mode optical fibers.

8. The system of claim 3, wherein the plurality of receiver channels further comprises one or more alignment optical fibers, wherein each of the one or more alignment optical fibers is at least partially disposed in a groove of a plurality of grooves in a receiver optical fiber housing, wherein the one or more alignment optical fibers facilitate alignment of the plurality of receiver optical fibers.

9. The system of claim 8, wherein one end of at least one of the one or more alignment optical fibers is coupled to a removable ferrule.

10. The system of claim 1, wherein the receiver channels further comprise one or more alignment optical fibers, wherein at least one of the alignment optical fibers facilitates providing of a reference signal for measuring distances of the one or more objects within the field-of-view.

11. The system of claim 1, wherein the receiver channels comprise receiver optical fibers, wherein the detector assemblies are flexibly distributed using the receiver optical fibers, and wherein detectors of the detector assemblies are optically coupled to respective receiver optical fibers to receive the redirected return light.

12. The system of claim 1, wherein at least one of the detector assemblies comprises one or more lenses, a bandpass filter, and a detector.

13. The system of claim 12, wherein the one or more lenses comprise:

- a second collimation lens optically coupled to a receiver channel of the plurality of receiver channels; and
- a focusing lens optically coupled to the detector, wherein the bandpass filter is disposed between the collimation lens and the focusing lens.

14. The system of claim 1, wherein at least one of the detector assemblies comprises an alignment ferrule mounted at one end of the detector assembly.

15. The system of claim 1, wherein the optical beam-shifting system comprises one or more of prisms, lenses, and mirrors configured to redirect the collimated transmission light beams such that the redirected collimated transmission light beams are substantially parallel to the collimated transmission light beams.

16. The system of claim 1, wherein the optical beam-shifting system comprises a periscope prism including two parallelly-disposed reflecting surfaces.

17. A light detection and ranging (LiDAR) system comprising:

- a plurality of transmitter channels comprising transmitter optical fibers disposed in an optical fiber housing at a pre-determined pitch from one another;
- a collimation lens positioned to be optically coupled to the plurality of transmitter channels to receive a plurality of transmission light beams transmitted from the transmitter optical fibers;
- a collection lens disposed to receive and redirect return light generated based on the plurality of transmission light beams; and an optical beam-shifting system optically coupled to the collimation lens;

wherein:

the collimation lens is configured to collimate the plurality of transmission light beams;

a combination of the plurality of transmitter channels and the collimation lens is configured to transmit a plurality of collimated transmission light beams at an angular separation from each other to provide an angular channel spacing that is related to the pre-determined pitch;

the collimation lens is positioned on a side of the collection lens to redirect the plurality of transmission light beams to the optical beam-shifting system; and the optical beam-shifting system is configured to redirect the plurality of collimated transmission light beams such that at least one of redirected collimated transmission light beams is positioned within an optical receiving aperture of the collection lens.

18. The system of claim 17, wherein the plurality of transmitter channels comprises four or more transmitter optical fibers.

19. The system of claim 17, wherein each of the plurality of transmitter optical fibers is at least partially disposed in a groove of a plurality of grooves in the optical fiber housing, each of the plurality of grooves being disposed at the pre-determined pitch from an adjacent groove.

20. The system of claim 19, wherein at least one of the plurality of grooves is a V-shaped groove.

21. The system of claim 17, wherein the pre-determined pitch is between about 100 μm and about 400 μm.

22. The system of claim 17, wherein the angular channel spacing is between about 0.5 degrees and 2.5 degrees.

23. The system of claim 17, wherein the angular channel spacing is further related to a focal length of the collimation lens.

24. The system of claim 17, wherein the transmitter channels are configured to provide an angular channel spacing selected based on at least one of a required LiDAR scan resolution, a region-of-interest requirement, or a scan range of a field-of-view.

25. The system of claim 17, wherein the transmitter optical fibers comprise single-mode optical fibers.

26. The system of claim 17, further comprising a receiver channel assembly, the receiver channel assembly comprising:

a plurality of receiver channels comprising receiver optical fibers optically coupled to the collection lens, wherein each of the receiver optical fibers is optically aligned based on a transmission angle of a corresponding transmission light beam; and a plurality of detector assemblies optically coupled to the plurality of receiver channels, wherein each of the receiver channels directs redirected return light to a detector assembly of the plurality of detector assemblies.

27. The system of claim 17, wherein the optical beam-shifting system comprises one or more of prisms, lenses, and mirrors configured to redirect the collimated transmission light beams such that the redirected collimated transmission light beams are substantially parallel to the collimated transmission light beams.

28. The system of claim 17, wherein the optical beam-shifting system comprises a periscope prism including two parallelly-disposed reflecting surfaces.

29. A vehicle comprising a light detection and ranging (LiDAR) scanning system, the LiDAR scanning system comprising:

a plurality of transmitter channels configured to transmit a plurality of transmission light beams to a field-of-view at a plurality of different transmission angles;

a collection lens disposed to receive and redirect return light obtained based on the plurality of transmission light beams illuminating one or more objects within the field-of-view;

a collimation lens disposed on a side of the collection lens to receive and redirect the plurality of transmission light beams to an optical beam-shifting system, wherein the optical beam-shifting system is configured to redirect the plurality of collimated transmission light beams such that at least one of redirected collimated transmission light beams is positioned within an optical receiving aperture of the collection lens;

a plurality of receiver channels optically coupled to the collection lens, wherein each of the receiver channels is optically aligned based on a transmission angle of a corresponding transmission light beam; and a plurality of detector assemblies optically coupled to the plurality of receiver channels, wherein each of the receiver channels directs redirected return light to a detector assembly of the plurality of detector assemblies.

* * * * *